(12) United States Patent
Gatland et al.

(10) Patent No.: US 10,527,429 B2
(45) Date of Patent: Jan. 7, 2020

(54) SAILING USER INTERFACE SYSTEMS AND METHODS

(71) Applicant: FLIR Systems, Inc., Wilsonville, OR (US)

(72) Inventors: Christopher Daniel Gatland, Fareham (GB); Gregory W. Wells, Fareham (GB); Mark Johnson, Vannes (FR); Marcel Tremblay, Goleta, CA (US)

(73) Assignee: FLIR Systems, Inc., Wilsonville, OR (US)

( * ) Notice: Subject to any disclaimer, the term of this patent is extended or adjusted under 35 U.S.C. 154(b) by 300 days.

(21) Appl. No.: 15/256,353

(22) Filed: Sep. 2, 2016

(65) Prior Publication Data

US 2016/0370187 A1   Dec. 22, 2016

Related U.S. Application Data

(63) Continuation of application No. PCT/US2015/018986, filed on Mar. 5, 2015.

(60) Provisional application No. 61/949,864, filed on Mar. 7, 2014.

(51) Int. Cl.
*G06F 19/00* (2018.01)
*G01C 21/20* (2006.01)
*B63B 49/00* (2006.01)

(52) U.S. Cl.
CPC ............ *G01C 21/203* (2013.01); *B63B 49/00* (2013.01)

(58) Field of Classification Search
CPC .............................. G01C 21/203; B63B 49/00
USPC ................................................... 701/400, 409
See application file for complete search history.

(56) References Cited

U.S. PATENT DOCUMENTS

| | | | | |
|---|---|---|---|---|
| 4,446,729 A * | 5/1984 | Watson, III | ......... | G01C 21/203 33/363 K |
| 5,191,341 A * | 3/1993 | Gouard | ............... | G01C 21/203 342/386 |
| 5,969,665 A * | 10/1999 | Yufa | .................... | G01S 13/9307 342/41 |
| 6,308,649 B1 | 10/2001 | Gedeon | | |
| 7,714,744 B1 * | 5/2010 | Wichgers | ............... | G08G 5/045 340/945 |
| 8,761,975 B2 * | 6/2014 | Watson | ............... | G07C 5/0816 701/21 |

(Continued)

FOREIGN PATENT DOCUMENTS

GB   2449560   11/2008

*Primary Examiner* — Ronnie M Mancho
(74) *Attorney, Agent, or Firm* — Haynes and Boone, LLP

(57) ABSTRACT

Techniques are disclosed for systems and methods to provide sailing information to users of a mobile structure. A sailing user interface system includes a logic device in communication with a compass or orientation sensor, a wind sensor, and/or a speed sensor. Sensor signals provided by the various sensors are used to determine a heading and a wind direction for the mobile structure, which can be referenced to Magnet North. The wind direction and heading may be used to orient a sail chart rendered by the logic device. The sail chart graphically indicates the heading of the mobile structure relative to the wind direction and a performance contour for the mobile structure. The sail chart may be displayed to a user to refine manual operation of the mobile structure, and the information rendered in the sail chart may be used to autopilot the mobile structure.

22 Claims, 16 Drawing Sheets

(56) References Cited

U.S. PATENT DOCUMENTS

| | | | | |
|---|---|---|---|---|
| 8,798,815 B1* | 8/2014 | Burgin | ................. | G08G 5/0021 |
| | | | | 701/9 |
| 9,846,038 B2* | 12/2017 | Thomas | ................. | G01C 21/00 |
| 9,909,891 B2* | 3/2018 | Langford-Wood | .... | G01C 21/36 |
| 2004/0249860 A1* | 12/2004 | Stechschulte | .......... | A01K 97/00 |
| 2006/0195903 A1* | 8/2006 | Cox | ....................... | G06Q 10/04 |
| | | | | 726/23 |
| 2007/0138347 A1* | 6/2007 | Ehlers | ................ | G01C 21/3461 |
| | | | | 246/1 R |
| 2007/0168120 A1* | 7/2007 | Vandenbergh | ....... | G01C 23/005 |
| | | | | 340/971 |
| 2015/0339930 A1* | 11/2015 | McCann | .............. | G08G 5/0039 |
| | | | | 701/528 |
| 2017/0210449 A1* | 7/2017 | Frisbie | ................... | B63B 49/00 |

* cited by examiner

SAILING USER INTERFACE SYSTEMS AND METHODS

CROSS-REFERENCE TO RELATED APPLICATIONS

This application is a continuation of International Application No. PCT/US2015/018986 filed Mar. 5, 2015 and entitled "SAILING USER INTERFACE SYSTEMS AND METHODS" which claims priority to and the benefit of U.S. Provisional Patent Application No. 61/949,864 filed Mar. 7, 2014 and entitled "SAILING USER INTERFACE SYSTEMS AND METHODS" which are all hereby incorporated by reference in their entirety.

TECHNICAL FIELD

One or more embodiments of the invention relate generally to user interfaces for mobile structures and more particularly, for example, to systems and methods for providing sailing information to users of mobile structures.

BACKGROUND

Conventional user interfaces for use with sailing consist of rows and columns of text and numbers, such as multiple rows of numbers for each of "boat speed vs. target," "optimal true wind angle," "time to burn," and others. Some sailing information systems include rows of six or more relatively large digital displays placed in a bulky grid at the foot of a ship's mast, and the crew is expected to interpret the complex array of numbers accurately and quickly and while attempting to manually pilot the ship. Many tacticians have even more displays showing histories for wind direction, speed, and other sensor information.

All data must be analyzed and assembled mentally, and each crew member builds their own mental map of the sailing route, the ship's situation, and the necessary tactical decisions that must be taken. Only the most skilled crew members are able to digest the numbers presented in this way, which leaves computer aided tactical decision making primarily in the hands of seasoned professionals. Attempts have been made to display some information in graphically by superimposing the data on a map, which is typically always displayed in the conventional "north up" way. However, these displays are still very complex to interpret and leave much of the key information as numbers. Thus, there is a need for an improved methodology to provide accurate and intuitive sailing user interfaces, particularly in the context of monitored mobile structures that are meant to participate in sailing races.

SUMMARY

Techniques are disclosed for systems and methods to provide sailing information to users of mobile structures. A sailing user interface system includes a logic device in communication with a compass or orientation sensor, a wind sensor, and/or a speed sensor. Sensor signals provided by the various sensors are used to determine a heading and a wind direction for the mobile structure, which can be referenced to Magnet North. The wind direction and heading may be used to orient a sail chart rendered by the logic device. The sail chart graphically indicates the heading of the mobile structure relative to the wind direction and a performance contour for the mobile structure. The sail chart may be displayed to a user to refine manual operation of the mobile structure, and the information rendered in the sail chart may be used to autopilot the mobile structure, and/or used to adjust a steering actuator, a propulsion system configuration, a boom angle, a sail trim, and/or other operational systems of the mobile structure.

In various embodiments, a sailing user interface system may include an orientation sensor, a compass, a gyroscope, an accelerometer, a speed sensor, one or more additional sensors, actuators, controllers, user interfaces, mapping systems, and/or other modules mounted to or in proximity to a vehicle. Each component of the system may be implemented with a logic device adapted to form one or more wired and/or wireless communication links for transmitting and/or receiving sensor signals, control signals, or other signals and/or data between the various components.

In one embodiment, a system may include a logic device configured to receive one or more sensor signals and render a sail chart for a mobile structure, where the logic device is adapted to receive a heading for the mobile structure; determine a wind direction for the mobile structure; and render the sail chart, and where the sail chart indicates the heading of the mobile structure relative to the wind direction and/or a performance contour for the mobile structure. The logic device may be configured to retrieve the performance contour from a plurality of such contours stored in memory based on a current state of the mobile structure, for example, or may be configured to determine the performance contour from sensor signals and/or using interpolation and/or curve fitting routines.

In another embodiment, a method may include receiving a heading for a mobile structure; determining a wind direction for the mobile structure; and rendering a sail chart, where the sail chart indicates the heading of the mobile structure relative to the wind direction and/or a performance contour for the mobile structure. Rendering the sail chart may include rendering various wind histograms, heel angle excursion diagrams, and/or other graphical diagrams aiding manual piloting of the mobile structure.

The scope of the invention is defined by the claims, which are incorporated into this section by reference. A more complete understanding of embodiments of the invention will be afforded to those skilled in the art, as well as a realization of additional advantages thereof, by a consideration of the following detailed description of one or more embodiments. Reference will be made to the appended sheets of drawings that will first be described briefly.

Embodiments of the invention and their advantages are best understood by referring to the detailed description that

DETAILED DESCRIPTION

In accordance with various embodiments of the present disclosure, sailing user interface systems and methods may advantageously include a controller in conjunction with an orientation sensor (e.g., a compass), a gyroscope, an accelerometer, a wind sensor, and/or a speed sensor providing measurements of a heading/orientation, a relative and/or absolute wind velocity (e.g., direction and/or magnitude/speed), and/or a speed of a mobile structure. For example, the sensors may be mounted to or within the mobile structure (e.g., a watercraft, aircraft, wheeled vehicle, and/or other mobile structure), or may be integrated with the controller. Embodiments of the present disclosure can render a sail chart for a mobile structure using a heading and/or a wind direction for the mobile structure. Any such renderings may be displayed to a user to provide easy to read feedback and suggested performance adjustments and aid operation of a sailing structure under race conditions, where safe reliance on a small number of intuitive graphical renderings can be a significant competitive advantage. Moreover, the information rendered in the sail chart may be used to autopilot the mobile structure reliably under variable conditions while emphasizing overall sailing performance.

The challenge addressed by embodiments of the disclosure is to provide all sailing crews, and particularly sail race crews, at all levels in the sport, with a few simple, clear, intuitive displays which will let them visualize what's happening on the race course. The technique used is graphical; numbers are replaced by image renderings, and the image renderings are designed so as to convey critical information needed to make essential decisions, stage by stage as the race progresses.

Figure 1:
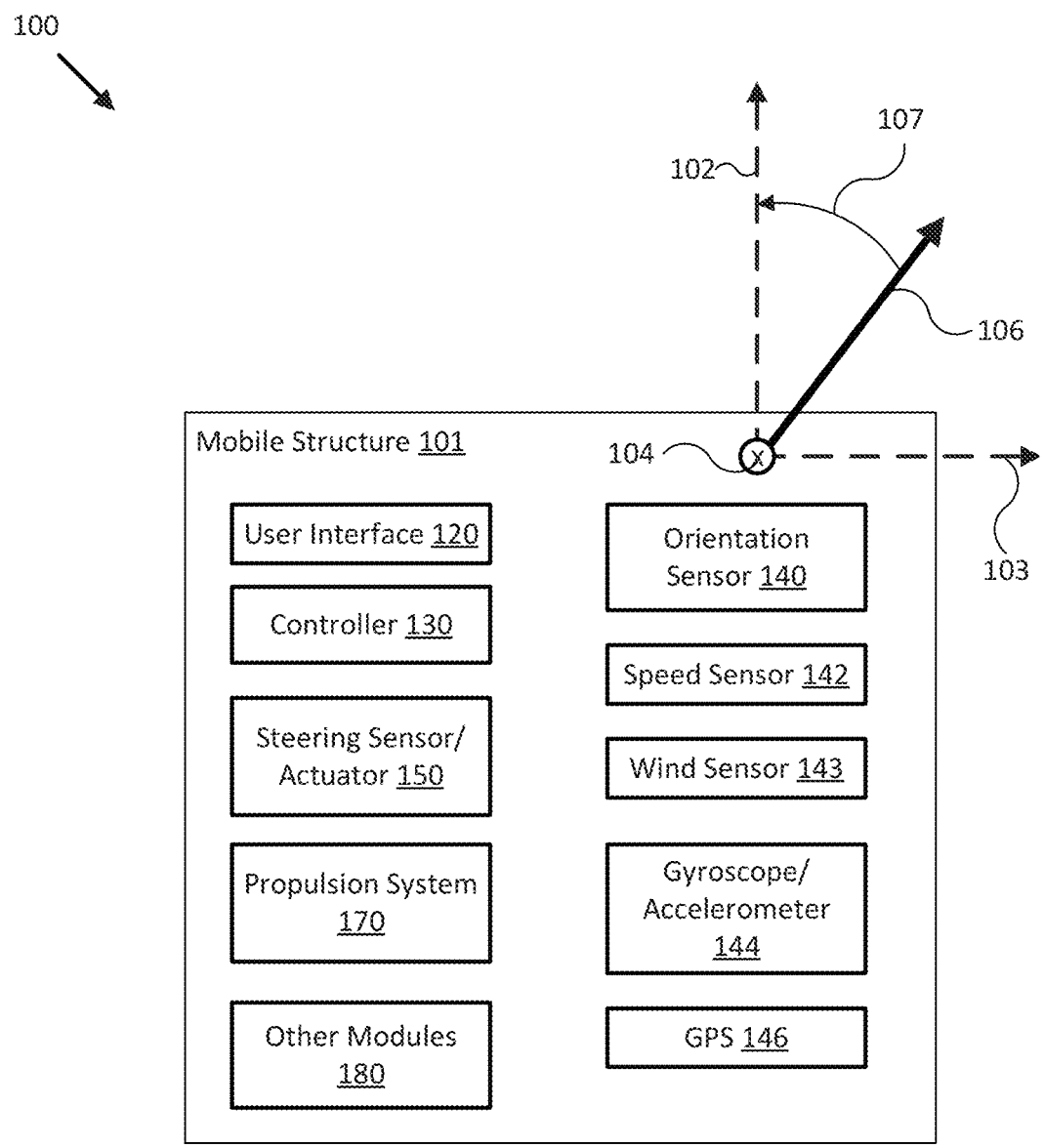
FIG. 1 illustrates a block diagram of a sailing user interface system in accordance with an embodiment of the disclosure.

FIG. 1 illustrates a block diagram of a sailing user interface system 100 in accordance with an embodiment of the disclosure. In various embodiments, system 100 may be adapted to measure a heading, an orientation, an acceleration, a wind velocity (e.g., direction and/or speed), and/or a speed for mobile structure 101. System 100 may then use these measurements to determine an absolute or relative wind direction (e.g., relative to Magnetic North or to a coordinate frame of mobile structure 101) for mobile structure 101. System 100 may render a sail chart based on the heading and the wind direction, where the sail chart indicates the heading relative to the wind direction and/or a performance contour for mobile structure 101, as described herein. In some embodiments, the performance contour may be selected from a plurality of predefined performance contours stored in system 100, for example, or may be determined by system 100 through user interaction with mobile system 100, through autopiloting of mobile structure 101 by system 100, and/or through various interpolation and/or curve fitting routines, as described herein. In various embodiments, system 100 may display the sail chart to a user through user interface 120, and/or use the information in the rendered sail chart to control operation of mobile structure 101, such as controlling steering actuator 150 and/or propulsion system 170 to orient mobile structure 101 according to a desired heading, such as heading angle 107, for example.

In the embodiment shown in FIG. 1, system 100 may be implemented to provide a sailing user interface for a particular type of mobile structure 101, such as an aerial drone, a watercraft, an aircraft, a robot, a vehicle, and/or other types of mobile structures. In one embodiment, system 100 may include one or more of a user interface 120, a controller 130, an orientation sensor 140, a speed sensor 142, a wind sensor 143, a gyroscope/accelerometer 144, a global positioning satellite system (GPS) 146, a steering sensor/actuator 150, a propulsion system 170, and one or more other sensors and/or actuators, such as other modules 180. In some embodiments, one or more of the elements of system 100 may be implemented in a combined housing or structure that can be coupled to mobile structure 101 and/or held or carried by a user of mobile structure 101.

Directions 102, 103, and 104 describe one possible coordinate frame of mobile structure 101 (e.g., for headings or orientations measured by orientation sensor 140 and/or angular velocities and accelerations measured by gyroscope/accelerometer 144). As shown in FIG. 1, direction 102 illustrates a direction that may be substantially parallel to and/or aligned with a longitudinal axis of mobile structure 101, direction 103 illustrates a direction that may be substantially parallel to and/or aligned with a lateral axis of mobile structure 101, and direction 104 illustrates a direction that may be substantially parallel to and/or aligned with a vertical axis of mobile structure 101, as described herein. For example, a roll component of motion of mobile structure 101 may correspond to rotations around direction 102, a pitch component may correspond to rotations around direction 103, and a yaw component may correspond to rotations around direction 104.

Heading angle 107 may correspond to the angle between a projection of a reference direction 106 (e.g., the local component of the Earth's magnetic field) onto a horizontal plane (e.g., referenced to a gravitationally defined "down" vector local to mobile structure 101) and a projection of direction 102 onto the same horizontal plane. In some embodiments, the projection of reference direction 106 onto a horizontal plane (e.g., referenced to a gravitationally defined "down" vector) may be referred to as Magnetic North. In various embodiments, Magnetic North, a "down" vector, and/or various other directions, positions, and/or fixed or relative reference frames may define an absolute coordinate frame, for example, where directional measurements referenced to an absolute coordinate frame may be referred to as absolute directional measurements (e.g., an "absolute" orientation). In some embodiments, directional measurements may initially be referenced to a coordinate frame of a particular sensor and be transformed (e.g., using parameters for one or more coordinate frame transformations) to be referenced to an absolute coordinate frame and/or a coordinate frame of mobile structure 101. In various embodiments, an absolute coordinate frame may be defined and/or correspond to a coordinate frame with one or more undefined axes, such as a horizontal plane local to mobile structure 101 referenced to a local gravitational vector but with an unreferenced and/or undefined yaw reference (e.g., no reference to Magnetic North).

User interface 120 may be implemented as a display, a touch screen, a keyboard, a mouse, a joystick, a knob, a steering wheel, a ship's wheel or helm, a yoke, and/or any other device capable of accepting user input and/or providing feedback to a user. In various embodiments, user interface 120 may be adapted to provide user input (e.g., as a type of signal and/or sensor information) to other devices of system 100, such as controller 130. User interface 120 may also be implemented with one or more logic devices that may be adapted to execute instructions, such as software instructions, implementing any of the various processes and/or methods described herein.

For example, user interface 120 may be adapted to form communication links, transmit and/or receive communications (e.g., sensor signals, control signals, sensor information, user input, and/or other information), determine wind directions, sail chart orientations, and/or performance contours, determine parameters for one or more coordinate frame transformations, and/or perform coordinate frame transformations, for example, or to perform various other processes and/or methods. User interface 120 may also be adapted to render and/or display one or more sail charts, heading vectors, mobile structure icons, performance contours, chart objects (e.g., indicating a position of a waypoint, a race pylon, a committee boat, a race start line, a competitor, a course limit, a stationary or mobile course hazard, and/or a physical object relative to a position of the mobile structure), extent icons, polar contours, sea trial performance contours, wind histograms, heel angle excursion diagrams, various overlays, and/or other diagrams and/or charts including sensor and/or other information as described herein.

In various embodiments, user interface 120 may be adapted to accept user input, for example, to form a communication link, to select a particular wireless networking protocol and/or parameters for a particular wireless networking protocol and/or wireless link (e.g., a password, an encryption key, a MAC address, a device identification number, a device operation profile, parameters for operation of a device, and/or other parameters), to select a method of processing sensor signals to determine sensor information, to adjust a position and/or orientation of an articulated sensor, and/or to otherwise facilitate operation of system 100 and devices within system 100. Once user interface 120 accepts a user input, the user input may be transmitted to other devices of system 100 over one or more communication links.

In one embodiment, user interface 120 may be adapted to receive a sensor or control signal (e.g., from orientation sensor 140 and/or steering sensor/actuator 150) over communication links formed by one or more associated logic devices, for example, and display sensor and/or other information corresponding to the received sensor or control signal to a user. In related embodiments, user interface 120 may be adapted to process sensor and/or control signals to determine sensor and/or other information. For example, a sensor signal may include an orientation, and angular velocity, an acceleration, a speed, a wind velocity, and/or a position for mobile structure 101. In such embodiment, user interface 120 may be adapted to process the sensor signals to determine sensor information indicating a performance contour, a sail chart, an estimated and/or absolute roll, pitch, and/or yaw (attitude and/or rate), and/or a position or series of positions of mobile structure 101, for example, and display the sensor information as feedback to a user. In one embodiment, user interface 120 may be adapted to display a time series of various sensor information and/or other parameters as part of or overlaid on a graph or map. For example, user interface 120 may be adapted to display a time series of positions, headings, and/or attitudes of mobile structure 101 overlaid on a geographical map, which may include one or more renderings indicating a corresponding time series of sail charts, performance contours, actuator control signals, and/or other sensor and/or control signals.

In some embodiments, user interface 120 may be adapted to accept user input including a user-defined target heading, waypoint, sailing route, and/or attitude for mobile structure 101, for example, and to generate control signals for steering sensor/actuator 150 and/or propulsion system 170 to cause mobile structure 101 to move according to the target heading, waypoint, sailing route, and/or attitude. More generally, user interface 120 may be adapted to display sensor information to a user, for example, and/or to transmit sensor information and/or user input to other user interfaces, sensors, or controllers of system 100, for instance, for display and/or further processing.

Controller 130 may be implemented as any appropriate logic device (e.g., processing device, microcontroller, processor, application specific integrated circuit (ASIC), field programmable gate array (FPGA), memory storage device, memory reader, or other device or combinations of devices) that may be adapted to execute, store, and/or receive appropriate instructions, such as software instructions implementing a control loop for controlling various operations of steering sensor/actuator 150, mobile structure 101, and/or system 100, for example. Such software instructions may also implement methods for processing sensor signals, determining sensor information, providing user feedback (e.g., through user interface 120), querying devices for operational parameters, selecting operational parameters for devices, or performing any of the various operations described herein (e.g., operations performed by logic devices of various devices of system 100).

In addition, a machine readable medium may be provided for storing non-transitory instructions for loading into and execution by controller 130. In these and other embodiments, controller 130 may be implemented with other components where appropriate, such as volatile memory, non-volatile memory, one or more interfaces, and/or various analog and/or digital components for interfacing with devices of system 100. For example, controller 130 may be adapted to store sensor signals, sensor information, parameters for coordinate frame transformations, calibration parameters, sets of calibration points, performance contours, and/or other operational parameters, over time, for example, and provide such stored data to a user using user interface 120. In some embodiments, controller 130 may be integrated with one or more user interfaces (e.g., user interface 120), and, in one embodiment, may share a communication module or modules. As noted herein, controller 130 may be adapted to execute one or more control loops for actuated device control, steering control (e.g., using steering sensor/actuator 150) and/or performing other various operations of mobile structure 101 and/or system 100. In some embodiments, a control loop may include processing sensor signals and/or sensor information in order to control one or more operations of mobile structure 101 and/or system 100.

Orientation sensor 140 may be implemented as one or more of a compass, float, accelerometer, and/or other device capable of measuring an orientation of mobile structure 101 (e.g., magnitude and direction of roll, pitch, and/or yaw, relative to one or more reference orientations such as gravity and/or Magnetic North) and providing such measurements as sensor signals that may be communicated to various devices of system 100. In some embodiments, orientation sensor 140 may be adapted to provide heading measurements for mobile structure 101. In other embodiments, orientation sensor 140 may be adapted to provide roll, pitch, and/or yaw rates for mobile structure 101 (e.g., using a time series of orientation measurements). Orientation sensor 140 may be positioned and/or adapted to make orientation measurements in relation to a particular coordinate frame of mobile structure 101, for example.

Speed sensor 142 may be implemented as an electronic pitot tube, metered gear or wheel, water speed sensor, and/or other device capable of measuring a linear speed of mobile structure 101 (e.g., in a surrounding medium and/or aligned with a longitudinal axis of mobile structure 101) and providing such measurements as sensor signals that may be communicated to various devices of system 100.

Wind sensor 143 may be implemented as one or more electronic pitot tubes, weather vanes, anemometers, and/or other devices capable of measuring a relative and/or absolute wind velocity (e.g., direction and/or magnitude) for mobile structure 101 (e.g., local to mobile structure 101) and providing such measurements as sensor signals that may be communicated to various devices of system 100. Wind sensor 143 may be positioned and/or adapted to make such measurements in relation to a particular coordinate frame of mobile structure 101, for example.

Gyroscope/accelerometer 144 may be implemented as one or more electronic sextants, semiconductor devices, integrated chips, accelerometer sensors, accelerometer sensor systems, or other devices capable of measuring angular velocities/accelerations and/or linear accelerations (e.g., direction and magnitude) of mobile structure 101 and providing such measurements as sensor signals that may be communicated to other devices of system 100 (e.g., user interface 120, controller 130). Gyroscope/accelerometer 144 may be positioned and/or adapted to make such measurements in relation to a particular coordinate frame of mobile structure 101, for example.

GPS 146 may be implemented as a global positioning satellite receiver and/or other device capable of determining absolute and/or relative position of mobile structure 101 based on wireless signals received from space-born and/or terrestrial sources, for example, and capable of providing such measurements as sensor signals that may be communicated to various devices of system 100. In some embodiments, GPS 146 may be adapted to determine a velocity, speed, yaw, and/or yaw rate of mobile structure 101 (e.g., using a time series of position measurements), such as an absolute velocity and/or a yaw component of an angular velocity of mobile structure 101. In various embodiments, one or more logic devices of system 100 may be adapted to determine a calculated speed of mobile structure 101 and/or a computed yaw component of the angular velocity from such sensor information.

Steering sensor/actuator 150 may be adapted to physically adjust a heading of mobile structure 101 according to one or more control signals and/or user inputs provided by a logic device of system 100, such as controller 130. Steering sensor/actuator 150 may include one or more actuators and control surfaces (e.g., a rudder or other type of steering mechanism) of mobile structure 101, and may be adapted to physically adjust the control surfaces to a variety of positive and/or negative steering angles/positions.

Propulsion system 170 may be implemented as a propeller, turbine, or other thrust-based propulsion system, a mechanical wheeled and/or tracked propulsion system, a sailing propulsion system, and/or other types of propulsion systems that can be used to provide motive force to mobile structure 101. For example, in some embodiments, propulsion system 170 may be implemented as a sailing propulsion system including one or more masts, booms, sails, and/or one or more sensors and/or actuators adapted to sense and/or adjust a boom angle, a sail trim, and/or other operational parameters of a sailing propulsion system, as described herein.

Other modules 180 may include other and/or additional sensors, actuators, communications modules/nodes, and/or user interface devices used to provide additional environmental information of mobile structure 101, for example. In some embodiments, other modules 180 may include a humidity sensor, a wind and/or water temperature sensor, a barometer, a radar system, a visible spectrum camera, an infrared camera, a sonar system, and/or other environmental sensors providing measurements and/or other sensor signals that can be displayed to a user and/or used by other devices of system 100 (e.g., controller 130) to provide operational control of mobile structure 101 that compensates for environmental conditions, such as water surface conditions/chop, water temperature, water depth, swell speed, amplitude, and/or direction, and/or an object in a path of mobile structure 101, for example. In some embodiments, other modules 180 may include one or more actuated devices (e.g., spotlights, cameras, radars, sonars, and/or other actuated devices) coupled to mobile structure 101, where each actuated device includes one or more actuators adapted to adjust an orientation of the device, relative to mobile structure 101, in response to one or more control signals (e.g., provided by controller 130).

In general, each of the elements of system 100 may be implemented with any appropriate logic device (e.g., processing device, microcontroller, processor, application specific integrated circuit (ASIC), field programmable gate array (FPGA), memory storage device, memory reader, or other device or combinations of devices) that may be adapted to execute, store, and/or receive appropriate instructions, such as software instructions implementing a method for providing a sailing user interface, for example, or for transmitting and/or receiving communications, such as sensor signals, sensor information, and/or control signals, between one or more devices of system 100. In one embodiment, such method may include instructions to receive a heading, orientation, angular velocity, acceleration, wind velocity, and/or speed of mobile structure 101 from various sensors, to determine a wind direction from the sensor signals, and/or to render a sail chart for mobile structure 101, for example, as described herein. In a further embodiment, such method may include instructions for forming one or more communication links between various devices of system 100.

In addition, one or more machine readable mediums may be provided for storing non-transitory instructions for loading into and execution by any logic device implemented with one or more of the devices of system 100. In these and other embodiments, the logic devices may be implemented with other components where appropriate, such as volatile memory, non-volatile memory, and/or one or more interfaces (e.g., inter-integrated circuit (I2C) interfaces, mobile industry processor interfaces (MIPI), joint test action group (JTAG) interfaces (e.g., IEEE 1149.1 standard test access port and boundary-scan architecture), and/or other interfaces, such as an interface for one or more antennas, or an interface for a particular type of sensor).

Each of the elements of system 100 may be implemented with one or more amplifiers, modulators, phase adjusters, beamforming components, digital to analog converters (DACs), analog to digital converters (ADCs), various interfaces, antennas, and/or other analog and/or digital components enabling each of the devices of system 100 to transmit and/or receive signals, for example, in order to facilitate wired and/or wireless communications between one or more devices of system 100. Such components may be integrated with a corresponding element of system 100, for example. In some embodiments, the same or similar components may be used to perform one or more sensor measurements, as described herein. Sensor signals, control signals, and other signals may be communicated among elements of system 100 using a variety of wired and/or wireless communication techniques, including voltage signaling, Ethernet, WiFi, Bluetooth, Zigbee, Xbee, Micronet, or other medium and/or short range wired and/or wireless networking protocols and/or implementations, for example. In such embodiments, each element of system 100 may include one or more modules supporting wired, wireless, and/or a combination of wired and wireless communication techniques.

In some embodiments, various elements or portions of elements of system 100 may be integrated with each other, for example, or may be integrated onto a single printed circuit board (PCB) to reduce system complexity, manufacturing costs, power requirements, and/or timing errors between the various measurements. For example, orientation sensor 140, gyroscope/accelerometer 144, and/or controller 130 may be configured to share one or more components, such as a memory, a logic device, a communications module, and/or other components, and such sharing may act to reduce and/or substantially eliminate such timing errors while reducing overall system complexity and/or cost.

Each element of system 100 may include one or more batteries or other electrical power storage devices, for example, and may include one or more solar cells or other electrical power generating devices (e.g., a wind or water-powered turbine, or a generator producing electrical power from motion of one or more elements of system 100). In some embodiments, one or more of the devices may be powered by a power source for mobile structure 101, using one or more power leads.

In various embodiments, a logic device of system 100 (e.g., of wind sensor 143, and/or other elements of system 100) may be adapted to determine parameters (e.g., using signals from various devices of system 100) for transforming a coordinate frame of wind sensor 143 to/from a coordinate frame of mobile structure 101, at-rest and/or in-motion, and/or other coordinate frames, as described herein. One or more logic devices of system 100 may be adapted to use such parameters to transform a coordinate frame of wind sensor 143 to/from a coordinate frame of orientation sensor 140 and/or mobile structure 101, for example. Furthermore, such parameters may be used to determine and/or calculate one or more adjustments to an orientation of wind sensor 143 that would be necessary to physically align a coordinate frame of wind sensor 143 with a coordinate frame of orientation sensor 140 and/or mobile structure 101. Adjustments determined from such parameters may be used to selectively power adjustment servos (e.g., of wind sensor 143 and/or other sensors or elements of system 100), for example, or may be communicated to a user through user interface 120, as described herein.

Figure 2:
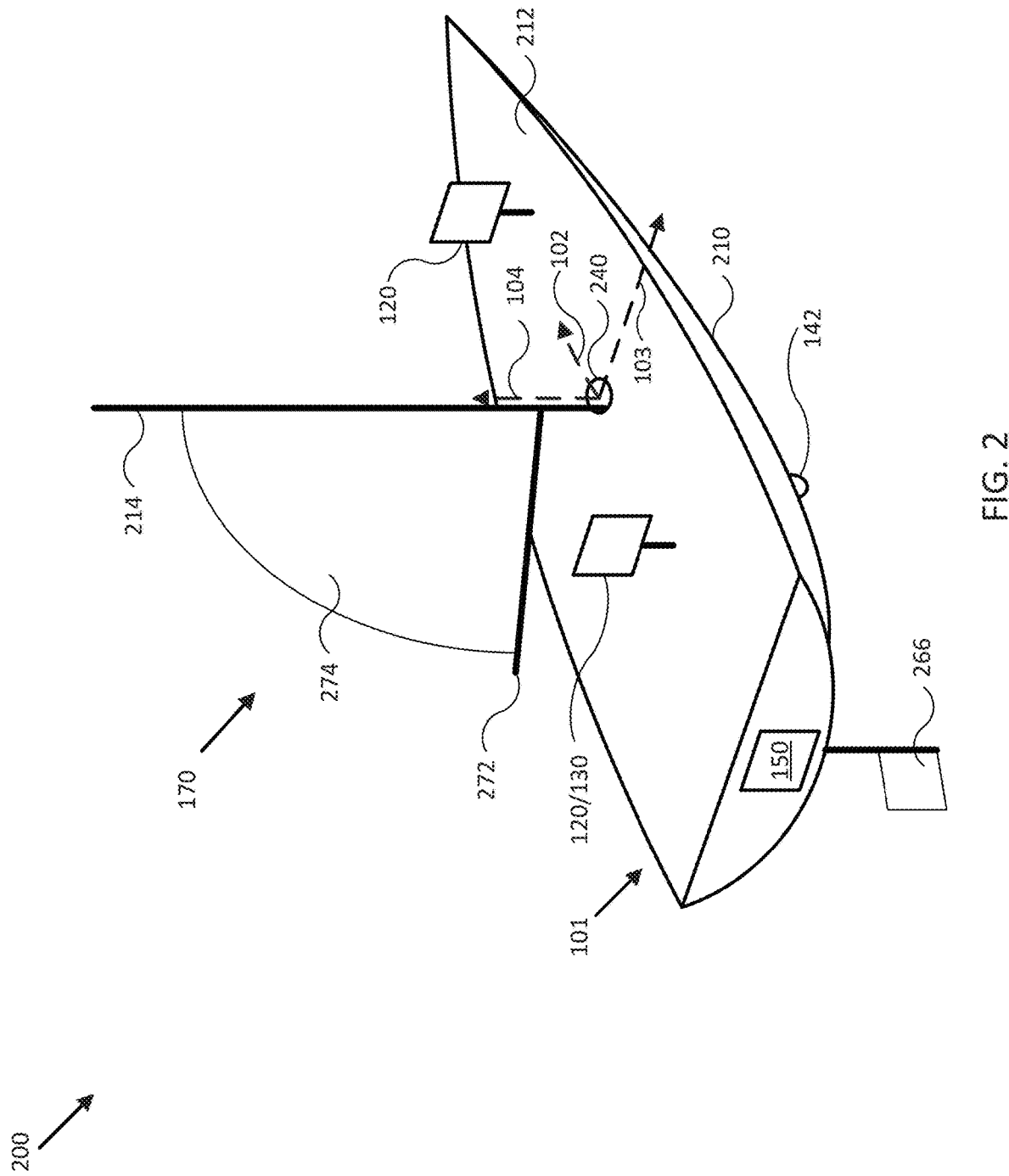
FIG. 2 illustrates a diagram of a sailing user interface system in accordance with an embodiment of the disclosure.

FIG. 2 illustrates a diagram of a sailing user interface system 200 in accordance with an embodiment of the disclosure. In the embodiment shown in FIG. 2, system 200 may be implemented to provide a sailing user interface for mobile structure 101, similar to system 100 of FIG. 1. For example, system 200 may include sensor cluster 240 (e.g., orientation sensor 140, wind sensor 143, gyroscope/accelerometer 144, and/or GPS 146), user interface/controller 120/130, secondary user interface 120, steering sensor/actuator 150, and various other sensors and/or actuators. In the embodiment illustrated by FIG. 2, mobile structure 101 is implemented as a sailboat including a hull 210, a deck 212, a mast/sensor mount 214, a rudder 266, and a sail system 170. In other embodiments, hull 210, deck 212, mast/sensor mount 214, rudder 266, and sail system 170 may correspond to attributes of another type of vehicle, robot, or drone, for example, such as an undercarriage, a passenger compartment, an engine/engine compartment, a trunk, a roof, a steering mechanism, and/or other portions of a vehicle.

As depicted in FIG. 2, sail system 170 of mobile structure 101 includes sail 274 coupled to mast 214 and boom 272. Other embodiments of sail system 170 may include multiple sails, masts, and/or booms in various configurations, such as configurations including one or more jibs, spinnakers, mainsails, headsails, and/or various multi-mast configurations. In some embodiments, sail system 170 may be implemented with various actuators to adjust various aspects of sail system 170, such as a boom angle for boom 272 or a sail trim for sail 274. For example, a portion of either mast 214 or boom 272 may be configured to rotate under power from a corresponding mast or boom actuator (e.g., embedded within mast 214 and/or boom 272) and partially or fully furl sail 274. In one embodiment, user interface/controller 120/130 may be configured to determine an estimated maximum speed for mobile structure 101 for a particular orientation (e.g., heading/yaw, roll, and/or pitch) of mobile structure 101 relative to a current wind direction, for example. In such embodiment, user interface/controller 120/130 may be configured to steer mobile structure 101 towards the corresponding heading using steering sensor/actuator 150 and/or to adjust a roll and/or pitch of mobile structure 101, using actuators to adjust a boom angle of boom 272 and/or a furl state of sail 274 for example, to conform mobile structure 101 to the corresponding particular roll and/or pitch to help reach the estimated maximum speed.

In one embodiment, user interfaces 120 may be mounted to mobile structure 101 substantially on deck 212 and/or mast/sensor mount 214. Such mounts may be fixed, for example, or may include gimbals and other leveling mechanisms/actuators so that a display of user interfaces 120 stays substantially level with respect to a horizon and/or a "down" vector (e.g., to mimic typical user head motion/orientation). In another embodiment, at least one of user interfaces 120 may be located in proximity to mobile structure 101 and be mobile throughout a user level (e.g., deck 212) of mobile structure 101. For example, secondary user interface 120 may be implemented with a lanyard and/or other type of strap and/or attachment device and be physically coupled to a user of mobile structure 101 so as to be in proximity to mobile structure 101. Secondary user interface 120 may also be implemented as one or more types of wearable user interfaces, such as augmented reality glasses/headsets, head up displays, ear/headphones and/or microphones (e.g., for audible user interaction), vibration motors/modules and/or other tactile interfaces, and/or other types of wearable or personal user interfaces. In various embodiments, user interfaces 120 may be implemented with a relatively thin display that is integrated into a PCB of the corresponding user interface in order to reduce size, weight, housing complexity, and/or manufacturing costs.

As shown in FIG. 2, in some embodiments, speed sensor 142 may be mounted to a portion of mobile structure 101, such as to hull 210, and be adapted to measure a relative water speed. In some embodiments, speed sensor 142 may be adapted to provide a thin profile to reduce and/or avoid water drag. In various embodiments, speed sensor 142 may be mounted to a portion of mobile structure 101 that is substantially outside easy operational accessibility. Speed sensor 142 may include one or more batteries and/or other electrical power storage devices, for example, and may include one or more water-powered turbines to generate electrical power. In other embodiments, speed sensor 142 may be powered by a power source for mobile structure 101, for example, using one or more power leads penetrating hull 210.

In the embodiment illustrated by FIG. 2, mobile structure 101 includes direction/longitudinal axis 102, direction/lateral axis 103, and direction/vertical axis 104 meeting approximately at mast/sensor mount 214 (e.g., near a center of gravity of mobile structure 101). In one embodiment, the various axes may define a coordinate frame of mobile structure 101 and/or sensor cluster 240. Each sensor adapted to measure an orientation and/or direction (e.g., headings, velocities, accelerations, or other states including a directional component) may be implemented with a mount, actuators, and/or servos that can be used to align a coordinate frame of the sensor with a coordinate frame of any element of system 200 and/or mobile structure 101. Each element of system 200 may be located at positions different from those depicted in FIG. 2. Each device of system 200 may include one or more batteries or other electrical power storage devices, for example, and may include one or more solar cells or other electrical power generating devices. In some embodiments, one or more of the devices may be powered by a power source for mobile structure 101. As noted herein, each element of system 200 may be implemented with an antenna, a logic device, and/or other analog and/or digital components enabling that element to provide, receive, and process sensor signals and interface or communicate with one or more devices of system 200. Further, a logic device of that element may be adapted to perform any of the methods described herein.

Figure 3:
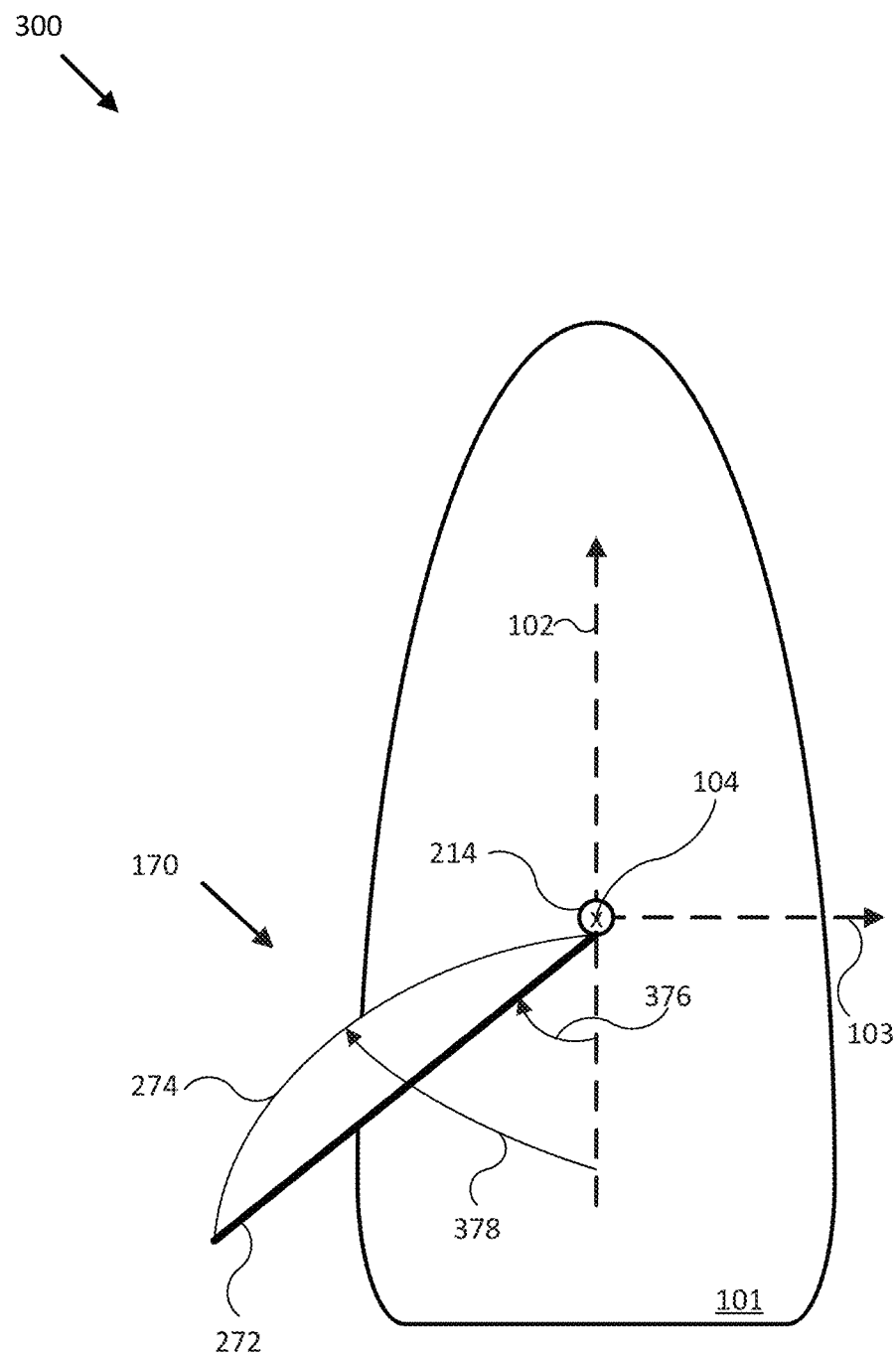
FIG. 3 illustrates a diagram of a sailing user interface system in accordance with an embodiment of the disclosure.

FIG. 3 illustrates a diagram of a sailing user interface system 300 in accordance with an embodiment of the disclosure. In the embodiment shown in FIG. 3, system 300 may be implemented to provide a sailing user interface for mobile structure 101, similar to system 200 of FIG. 2. For example, system 300 may include various sensors and/or actuators of systems 100 and/or 200. In the embodiment illustrated by FIG. 3, mobile structure 101 is implemented as a sailboat including sail system 170. Similar to FIG. 2, sail system 170 of FIG. 3 includes sail 274 coupled to mast 214 and boom 272. Also shown are boom angle 376, which may be adjusted by a boom angle actuator integrated with mast 214 and/or boom 272, and sail trim 378. In some embodiments, sail trim 378 may correspond to the angle between longitudinal axis 102 and a tangent plane of sail 274, where the tangent plane of sail 274 roughly corresponds to aggregate moment of sail 274 taking into account any billowing or other shape of sail 274 due to the competing forces of wind and the tension between sail 274, boom 272, and mast 214. More generally, sail trim 378 may correspond to the shape and angle of sail 274 relative to the present wind direction.

In some embodiments, sail trim 378 may be adjusted by one or more actuators configured to incrementally furl and/or unfurl sail 274, to increase and/or decrease tension between sail 274 and mast 214 and/or boom 272, and/or to adjust boom angle 376. In various embodiments, sail trim 378 may be used to adjust a pitch, roll, and/or speed/acceleration of mobile structure 101 separately from adjusting a heading/steering angle of mobile structure 101. For example, user interface/controller 120/130 may be configured adjust sail trim 378 to adjust a roll and/or pitch of mobile structure 101, using actuators to adjust a boom angle of boom 272 and/or a furl state of sail 274 for example, to conform mobile structure 101 to an orientation corresponding to an estimated maximum speed.

Figure 4A:
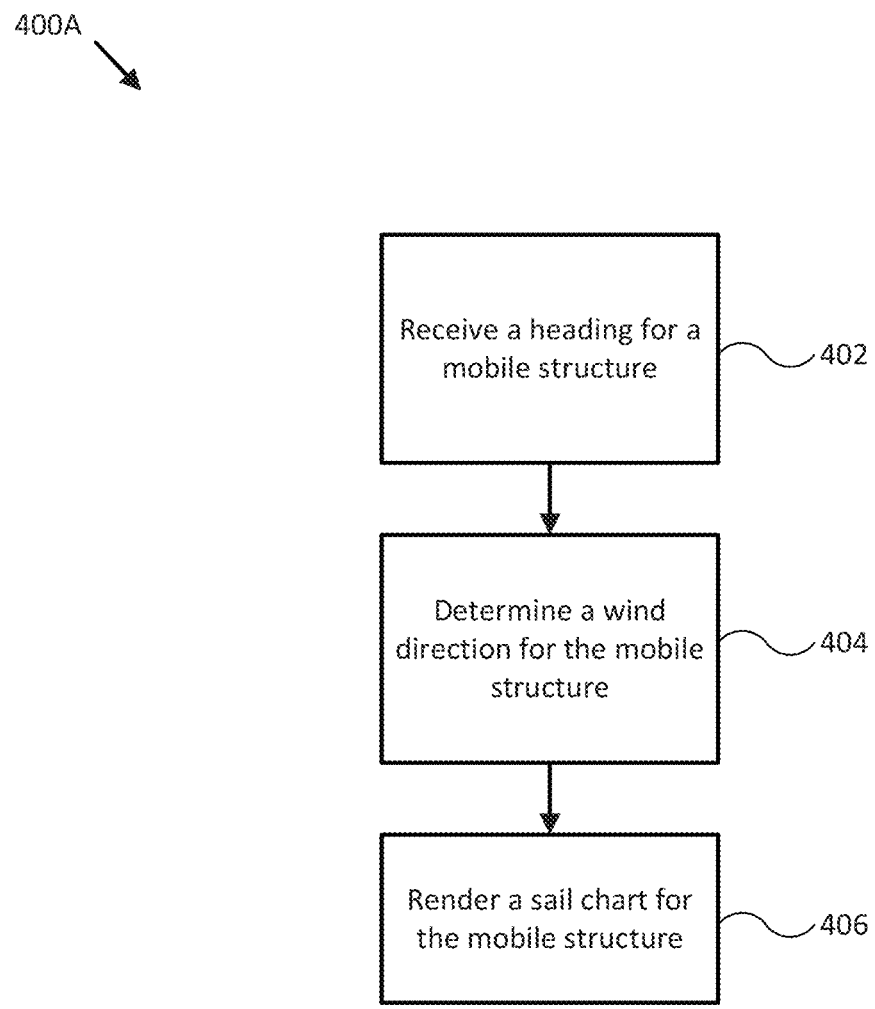
FIGS. 4A-4B illustrate flow diagrams of various operations to provide a sailing user interface in accordance with embodiments of the disclosure.
Figure 4B:
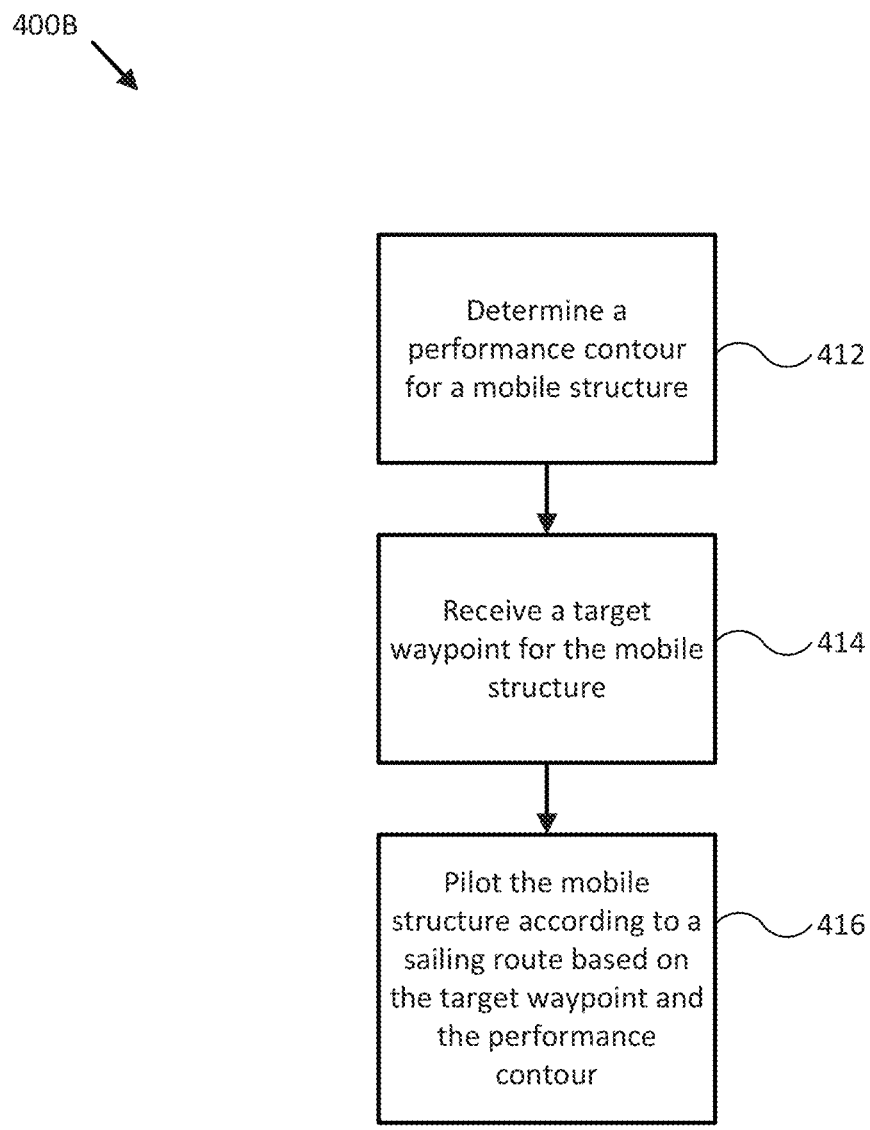

FIGS. 4A-B illustrate flow diagrams of respective processes 400A and 400B to provide sailing user interfaces for mobile structure 101 in accordance with embodiments of the disclosure. In some embodiments, the operations of FIGS. 4A-B may be implemented as software instructions executed by one or more logic devices associated with corresponding electronic devices and/or sensors of systems 100, 200, and/or 300 of FIGS. 1-3. More generally, the operations of FIGS. 4A-B may be implemented with any combination of software instructions and/or electronic hardware (e.g., inductors, capacitors, amplifiers, or other analog and/or digital components).

It should be appreciated that any step, sub-step, sub-process, or block of processes 400A and 400B may be performed in an order or arrangement different from the embodiments illustrated by respective FIGS. 4A-B. For example, in other embodiments, one or more blocks may be omitted from the various processes, and blocks from one process may be included in another process. Furthermore, block inputs, block outputs, various sensor signals, sensor information, calibration parameters, and/or other operational parameters may be stored to one or more memories of systems 100, 200, and/or 300 prior to moving to a following portion of a corresponding process. Although processes 400A and 400B are described with reference to systems 100, 200, and 300, processes 400A and 400B may be performed by other systems different from systems 100, 200, and 300 and including a different selection of electronic devices, sensors, mobile structures, and/or mobile structure attributes.

Process 400A represents a method for providing sailing user interfaces for mobile structure 101 using systems 100, 200, and/or 300 in accordance with embodiments of the disclosure. At the initiation of process 400A, various system parameters may be populated by prior execution of a process similar to process 400A, for example, or may be initialized to zero and/or one or more values corresponding to typical, stored, and/or learned values derived from past operation of process 400A, as described herein. Furthermore, such system parameters, including user selections of various rendering options (alignment, active elements, overlays, and/or other rendering options) may be populated by prior and/or contemporaneous user input provided to a user interface (e.g., user interface 120).

In block 402, a logic device receives a heading for a mobile structure. For example, controller 130 of system 100 may be configured to receive a heading and/or orientation from orientation sensor 140, where orientation sensor 140 may be coupled to mobile structure 101. In some embodiments, controller 130 may be configured to receive other sensor information in addition to the heading, such as a speed from speed sensor 142, a relative or absolute wind velocity from wind sensor 143, and/or other sensor information from various sensors of systems 100, 200, and/or 300. In other embodiments, controller 130 may be configured to receive a series of headings from orientation sensor 140, for example, and/or a time series of other sensor information, such as one or more roll angles and/or relative or absolute wind velocities for mobile structure 101.

In various embodiments, controller 130 may be configured to receive a time series of positions of mobile structure 101 from GPS 146, for example, and determine a derived heading and/or speed from the series of positions (e.g., by subtracting one or more prior position measurements from a present position measurement, and/or using other methods to derive a heading and/or speed from a time series of positions). In some embodiments, controller 130 may be adapted to select the measured heading and/or speed or the derived heading and/or speed as the heading and/or speed of mobile structure 101 (e.g., the calculated heading and/or speed) based on which value is larger, for example, or on which value is available. In further embodiments, controller 130 may be adapted to determine the heading and/or speed of mobile structure 101 by interpolating, averaging, filtering, and/or otherwise processing the measured heading and/or speed and/or the derived heading and/or speed. In general, controller 130 may be configured to interpolate, average, filter, and/or otherwise process or stabilize one or more of the measurements prior to proceeding to block 404.

In block 404, a logic device determines a wind direction for the mobile structure. For example, controller 130 may be configured to determine a wind direction based, at least in part, on a relative or absolute wind direction/velocity and/or a measured or calculated heading received or derived in block 402. In one embodiment, wind sensor 143 may be configured to provide a relative wind velocity (direction and magnitude) for mobile structure 101, and controller 130 may be configured to determine the wind direction as the direction of the relative wind velocity. In another embodiment, wind sensor 143 may be configured to provide an absolute wind velocity and controller 130 may be configured to determine the wind direction by combining the heading with the direction of the absolute wind velocity. In some embodiments, controller 130 may be configured to determine the wind direction by performing one or more coordinate frame transformations between a coordinate frame of wind sensor 143 and a coordinate frame of orientation sensor 140, mobile structure 101, and/or an absolute coordinate frame. In various embodiments, controller 130 may be configured to interpolate, average, filter, and/or otherwise process or stabilize the wind direction prior to proceeding to block 406.

In block 406, a logic device renders a sail chart for the mobile structure. For example, controller 130 may be configured to render a sail chart for mobile structure 101, where the sail chart indicates the heading of the mobile structure relative to the wind direction and/or a performance contour for the mobile structure. In one embodiment, controller 130 may be configured to render a heading vector and/or mobile structure icon corresponding to a heading and/or speed of mobile structure 101, for example, where the orientation of the heading vector and/or mobile structure icon in the sail chart rendering indicates the heading of mobile structure 101 relative to the wind direction. In such embodiments, controller 130 may be configured to orient a vertical axis of the sail chart rendering so that it is substantially aligned with the wind direction determined in block 404, and so the deviation of the heading of mobile structure 101 from vertical in the sail chart rendering indicates the relative heading of mobile structure 101 (e.g., relative to the wind direction).

In various embodiments, controller 130 may be configured to render one or more chart objects indicating relative positions of various graphical markers and/or physical objects near mobile structure 101 as part of the sail chart. In such embodiments, controller 130 may be configured to orient a vertical axis of the sail chart rendering so that it is substantially aligned with the wind direction determined in block 404, for example, or so that it is substantially aligned with a vector corresponding to the position of a chart object relative to the position of mobile structure 101. Where the vertical axis is aligned with the relative chart object position, controller 130 may be configured to indicate the wind direction determined in block 404 by rendering grid lines and/or a performance contour aligned with the wind direction.

In another embodiment, controller 130 may be configured to render a performance contour, a heading vector, and/or mobile structure icon, for example, where the orientation of the heading vector and/or mobile structure icon in the sail chart rendering relative to the performance contour indicates the heading of mobile structure 101 relative to the wind direction. In such embodiments, controller 130 may be configured to orient the performance contour so that it is substantially aligned with the wind direction determined in block 404, and so the deviation of the heading of mobile structure 101 from the performance contour in the sail chart rendering indicates the relative heading of mobile structure 101 (e.g., relative to the wind direction). Controller 130 may be configured to orient a vertical axis of the sail chart rendering so that it is substantially aligned with the wind direction determined in block 404, a vector corresponding to the relative position of a chart object (e.g., a target waypoint, a first race mark/pylon, a second race mark/pylon, and/or other course marks), a race start line, a race route (e.g., a first beat and/or subsequent beats), and/or another direction corresponding to a sensor measurement, a series of sensor measurements, and/or a chart object, any of which may be rendered as part of the sail chart rendering. For example, controller 130 may be configured to orient a vertical axis of the sail chart rendering so that it is substantially aligned to a detected/determined ground wind (e.g., relative to land), sailing/apparent wind (e.g., relative to the mobile structure), and/or true wind (e.g., relative to the sailing medium).

As described herein, a performance contour may be implemented as a polar contour indicating the estimated maximum speeds for mobile structure 101 as a function of relative heading (e.g., relative to the wind direction). Each mobile structure presents a substantially unique profile to the wind and the sailing medium (e.g., water) and has a substantially unique response to different wind speeds, relative headings, roll and/or pitch angles relative to the sailing medium surface, linear speed relative to the sailing medium surface, different sailing medium surface characteristics (e.g., chop, swell, temperature), and/or other configurations and/or environmental conditions of the mobile structure. Therefore, each mobile structure has a substantially unique set of polar contours corresponding to the various mobile structure states, configurations, and/or environmental conditions.

In some embodiments, controller 130 may be configured to determine a performance contour to render as part of the sail chart rendering by selecting one polar contour from a set of manufacturer supplied and/or default polar contours (e.g., stored in memory) that corresponds to a measured state for mobile structure 101 (e.g., it's orientation, speed, configuration, related environmental conditions, and/or other state parameters for mobile structure 101). In other embodiments, controller 130 may be configured to select two or more polar contours from a supplied set of polar contours, based on a measured state of mobile structure 101, and interpolate between the two or more polar contours to determine the appropriate performance contour. In further embodiments, controller 130 may be configured to determine the appropriate performance contour by constructing a sea trial performance contour from sensor measurements made during typical and/or directed maneuvers.

For example, controller 130 may be configured to determine a performance contour by receiving a series of relative wind velocities from wind sensor 143, determining and/or measuring a corresponding series of measured speeds, orientations, configurations, and/or environmental conditions for mobile structure 101, detecting a set of maximum achieved measured speeds cross referenced to the series of relative wind velocities, orientations, configurations, and/or environmental conditions, and determining the performance contour based, at least in part, on the set of maximum achieved measured speeds. In one embodiment, controller 130 may be configured to render a sea trial performance contour based, at least in part, on the set of maximum achieved measured speeds, wherein the sea trial performance contour includes one or more incomplete portions corresponding to relative headings with deficient measured speeds, such as relative headings with no corresponding measured speed and/or a measured speed that is discontinuous and/or disjoint with respect to complete and/or estimated portions of the sea trial performance contour.

If the sea trial contour includes one or more incomplete portions, controller 130 may be configured to render and/or display the sea trial performance contour to a user and provide direction for manual operation of mobile structure 101 to complete the seal trial performance contour, for example, and/or may be configured to autopilot mobile structure 101 to complete the seal trial performance contour. Controller 130 may be configured to update the set of maximum achieved measured speeds to account for the incomplete portions of the sea trial performance contour by receiving an updated series of relative wind velocities, measured speeds, orientations, configurations, and/or environmental, conditions and/or by interpolating across the incomplete portions (e.g., using linear interpolation, spline interpolation, and/or other curve fitting processes). Controller 130 may be configured to determine the performance contour based, at least in part, on the updated set of maximum achieved measured speeds.

Where the sail chart rendering includes a performance contour (e.g., by user selection), controller 130 may be configured to render a heading vector by scaling the length of the heading vector to indicate a measured speed of mobile structure 101 relative to the estimated maximum speed from the corresponding polar contour. For example, controller 130 may be configured to scale the length of the heading vector non-linearly to more clearly indicate the presence of small deviations from the estimated maximum speed for a particular relative heading. In some embodiments, controller 130 may be configured to scale the corresponding polar contour (e.g., and/or a corresponding heading vector) according to a reference time period to indicate an estimated maximum travel of the mobile structure during the reference time period, as described herein. In one embodiment, the reference time period may be a rolling time period, for example, so that the size of the performance contour is proportional to the speed of mobile structure 101. In another embodiment, the reference time period may be a countdown time period, such as a countdown to a race start for example, so that the size of the performance contour indicates the maximum distance mobile structure 101 can travel in one or more relative headings by the start time, and the size of the performance contour shrinks (e.g., to zero/extinguishment, to a minimum size related to a measured speed of mobile structure 101, and/or to other sizes) as the start time is reached. In a further embodiment, the reference time period may be a projected or estimated transit time to reach a target waypoint, for example, based on a measured speed, heading, wind velocity, performance contour, and/or other sensor information for mobile structure 101.

In a some embodiments, controller 130 may be configured to determine a velocity vector for the sailing medium based, at least in part, on a time series of absolute positions for the mobile structure (e.g., provided by GPS 146), and to indicate the presence of movement of the sailing medium (e.g., presence of a tidal or other type of current) by rendering the mobile structure icon offset from a centroid of the performance contour (e.g., where the estimated maximum velocity is zero) by the velocity vector for the sailing medium (e.g., positive or negative), as described herein. In an alternative embodiment, controller 130 may be configured to render the performance contour offset from the mobile structure icon by the velocity vector for the sailing medium.

Block 406 may also include rendering one or more histograms and/or other charts or diagrams related to operation of mobile structure 101. For example, controller may be configured to render one or more wind histograms as an overlay and/or portion of the sail chart, where each wind histogram can be implemented as a chart indicating a distribution of absolute wind directions, a distribution of average wind speeds, and/or a current absolute wind direction, as described herein. In one embodiment, controller 130 may be configured to receive a series of relative wind velocities from wind sensor 143, for example, and then determine a distribution of absolute wind directions and/or a distribution of average wind speeds for selected intervals of absolute wind directions based, at least in part, on the series of relative wind velocities and/or a corresponding series of headings for the mobile structure.

In another example, controller 130 may be configured to render a heel angle excursion diagram based on a measured roll angle and a target roll angle as an overlay and/or portion of the sail chart, where the heel angle excursion diagram indicates the measured roll angle, the target roll angle, and/or a magnitude and direction of a roll angle error between the target roll angle and the roll angle. In one embodiment, controller 130 may be configured to extract the target roll angle from the selected performance contour as a performance parameter associated with the performance contour (e.g., a criteria for selecting a particular polar contour for mobile structure 101). In another embodiment, controller 130 may be configured to determine the target roll angle from one or more sensor measurements associated with one or more sea trial performance contours and/or polar contours for mobile structure 101. In a similar fashion, controller 130 may be configured to render a pitch angle excursion diagram based on a measured pitch angle and a target pitch angle, where the pitch angle excursion diagram indicates a magnitude and direction of a pitch angle error between the target pitch angle and the pitch angle, and where the target pitch angle may be extracted from the selected performance contour as a performance parameter associated with the performance contour.

It is contemplated that any one or combination of methods to provide a sailing user interface may be performed according to one or more operating contexts of a control loop, for example, such as a startup, learning, running, and/or other type operating context. For example, process 400A may proceed back to block 402 and through process 400A again to produce an updated sail chart and/or one or more performance contours, as in a control loop.

Process 400B represents a method for providing autopiloting for systems 100, 200, and/or 300 using a sailing user interface in accordance with embodiments of the disclosure. At the initiation of process 400B, various system parameters may be populated by prior execution of a process similar to process 400A and/or 400B, for example, or may be initialized to zero and/or one or more values corresponding to typical, stored, and/or learned values derived from past operation of process 400A and/or 400B, as described herein. Furthermore, such system parameters, including user selections of various rendering options, routing methods (e.g., maximum and/or percentage of maximum performance), and entry of various chart objects may be populated by prior and/or contemporaneous user input provided to a user interface (e.g., user interface 120).

In block 412, a logic device determines a performance contour for a mobile structure. Block 412 is substantially similar to portions of process 400A of FIG. 4A and can be performed similarly.

In block 414, a logic device receives a target waypoint for the mobile structure. For example, controller 130 may be configured to receive a target waypoint implemented as a geographical position on a map as user input from user interface 120. In some embodiments, a series of target waypoints may be provided as user input, such as a series of target waypoints corresponding to a race course. In various embodiments, controller 130 may also be configured to receive positions for one or more chart objects, such as course boundaries, hazards, competitors and/or committee boats (e.g., as radar and/or radio broadcast sensor information), and/or other chart objects, environmental conditions, and/or sensor information that might influence selection of a route to the target waypoint.

In block 416, a logic device pilots the mobile structure according to a sailing route based on the target waypoint and the performance contour. For example, controller 130 may be configured to determine the sailing route based, at least in part, on a heading, a wind direction, a performance contour (e.g., from block 412), a position of the waypoint, and/or other sensor information for mobile structure 101 received and/or provided from blocks 412 and/or 414. In some embodiments, the sailing route may include one or more tacks to conform the sailing route to course boundaries and/or hazards, for example, and/or to decrease an overall transit time to the waypoint. In various embodiments, controller 130 may be configured to update the sailing route while in transit to compensate for changing environmental conditions, relative positions of physical objects along the sailing route, and/or a changing measured state for mobile structure 101. Controller 130 may be configured to pilot mobile structure 101 along a sailing route by controlling operation of steering sensor/actuator 150 of mobile structure 101 and/or any other elements of system 100, 200, and/or 300.

In some embodiments, a user may select a desired absolute and/or relative orientation (roll, pitch, and/or yaw) and/or range of orientations of mobile structure 101 using user interface 120, for example, and controller 130 may be configured to use sensor information from blocks 412 and/or 414 to adjust the orientation of mobile structure 101 (e.g., using control signals transmitted to various actuators, steering sensor/actuator 150, and/or propulsion system 170) to substantially match and/or fall within the selected orientation or orientation range as mobile structure 101 moves. For example, a user may select a maximum roll and/or pitch for mobile structure 101, and controller 130 may be configured to control steering sensor/actuator 150 and/or propulsion system 170 to adjust motion of mobile structure 101 to fall substantially within the selected maximum roll and/or pitch while steering mobile structure 101 toward the target waypoint.

It is contemplated that any one or combination of methods to provide attitude adjustments using stabilized attitude estimates may be performed according to one or more operating contexts of a control loop, for example, such as a startup, learning, running, and/or other type operating context. For example, process 400B may proceed back to block 412 and through process 400B again to provide updated performance contours and/or sailing routes, as in a control loop.

Embodiments of the present disclosure can thus provide reliable and intuitive sail charts using heading and/or wind direction measurements provided by relatively simple sensors. Such embodiments may be used to provide a sailing user interface and a performance oriented autopilot for a mobile structure and/or systems, devices, and/or sensors coupled to the mobile structure.

FIGS. 5-15 illustrate various renderings by a sailing user interface system in accordance with embodiments of the disclosure. In some embodiments, the various renderings of FIGS. 5-15 may be implemented as software instructions executed by one or more logic devices associated with corresponding electronic devices and/or sensors of systems 100, 200, and/or 300 of FIGS. 1-3. More generally, the renderings of FIGS. 5-15 may be implemented with any combination of software instructions and/or electronic hardware (e.g., inductors, capacitors, amplifiers, or other analog and/or digital components). Furthermore, the various renderings of FIGS. 5-15 may be displayed through use of one or more user interfaces, such as user interface 120. In various embodiments, user interface 120 may be configured to present various rendering options to a user and/or accept prior and/or contemporaneous user input including user selections of various rendering options (e.g., selection of any rendering, sub-rendering, and/or combination of renderings illustrated by FIGS. 5-15 for display). In such embodiments, user interface 120 may be configured to render and display a sail chart according to those user selections.

It should be appreciated that any rendering, sub-rendering, overlay, chart, or combination of renderings may be displayed in an arrangement different from the embodiments illustrated by FIGS. 5-15 (e.g., as selected by user input). For example, in other embodiments, one or more elements of a particular rendering may be omitted from the various renderings, and elements from one rendering may be included in another rendering. Furthermore, inputs, outputs, various sensor signals, sensor information, calibration parameters, and/or other operational parameters, constants, state variables or other information may be rendered in diagram, chart, and/or overlay form and/or displayed by one or more user interfaces of systems 100, 200, and/or 300 while rendering and/or displaying the various renderings of FIGS. 5-15. Although the renderings of FIGS. 5-15 are described with reference to systems 100, 200, and 300, such renderings may be performed by other systems different from systems 100, 200, and 300, and including a different selection of electronic devices, sensors, mobile structures, and/or mobile structure attributes.

Figure 5:
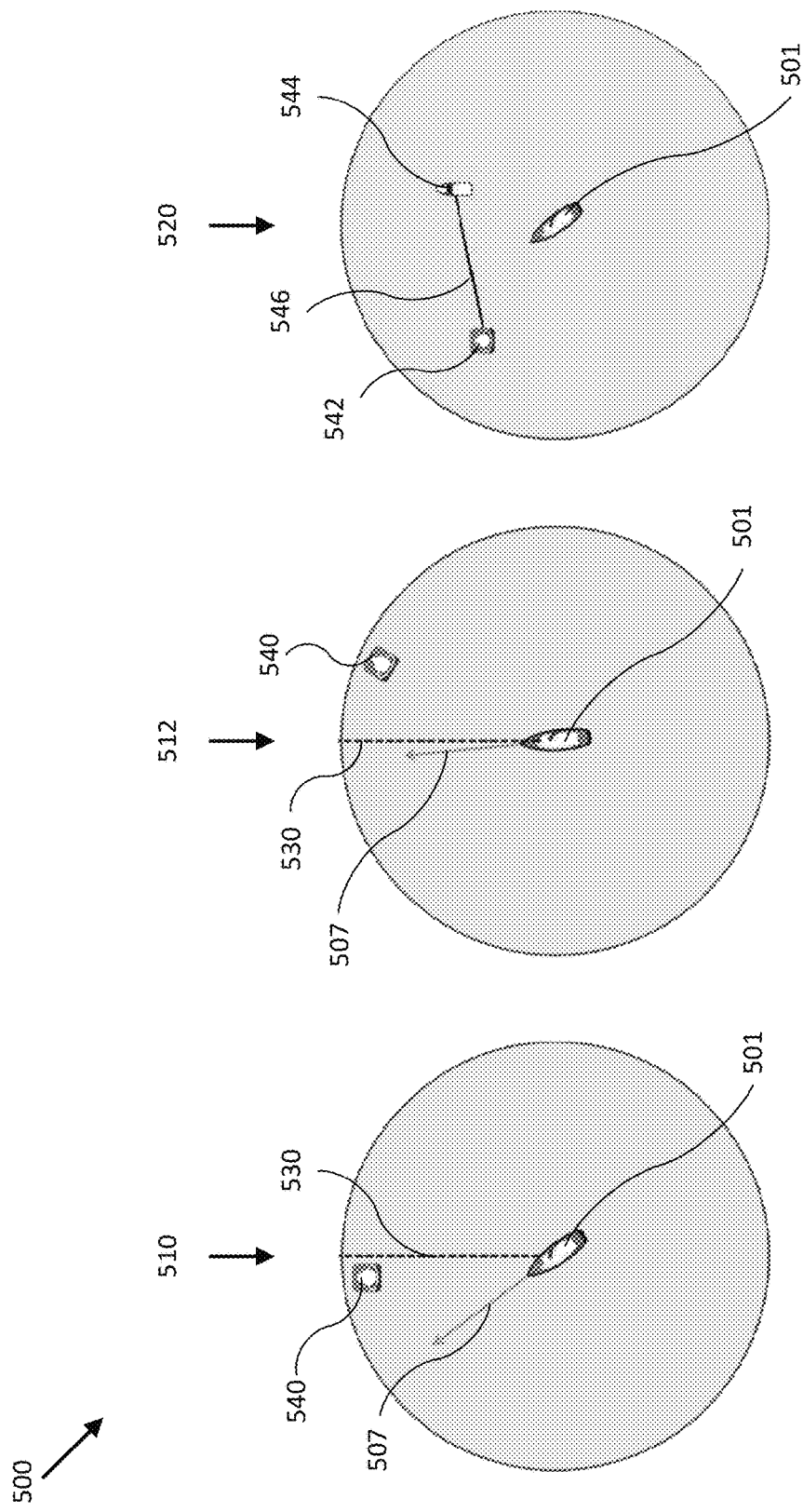
FIGS. 5-15 illustrate various renderings by a sailing user interface system in accordance with embodiments of the disclosure.

FIG. 5 illustrates three renderings 510, 512, 520 of a sail 500 chart according to embodiments of the disclosure. Renderings 510, 512, 520 include renderings of mobile structure icon 501, heading vector 507, and various chart objects (e.g., wind direction indicator 530, chart object 540, pylon 542, committee boat icon 544, and race start line 546). Mobile structure icon 501 and committee boat icon 544 may be configured to indicate respective orientations of a mobile structure (e.g., mobile structure 101) and a committee boat. In some embodiments, the size of the rendered icons may be scaled to indicate their absolute speed. In one embodiment, rendering 512 is an updated version of rendering 510 after the wind direction has changed, and rendering 520 indicates an approaching race start.

Each rendering 510, 512, 520 is implemented such that a vertical axis of the rendering is substantially aligned with the wind direction for the mobile structure, for example, and each rendering can be dynamically updated as the wind direction changes. As such, the wind always comes from the top of the screen down to the bottom. The mobile structure and all chart objects are shown relative to the wind, and because the wind reference is fixed, the radial position of all chart objects will change continually as the wind direction changes. Therefore, a user can always intuitively tell which chart objects are further to windward because this equates to being further to the top of the screen. For example, when viewing race start line 546, it can readily be seen which end of the line is to windward and hence is the favored end for the start. In rendering 520, the committee boat end 544 is to windward and is therefore favored.

Figure 6:
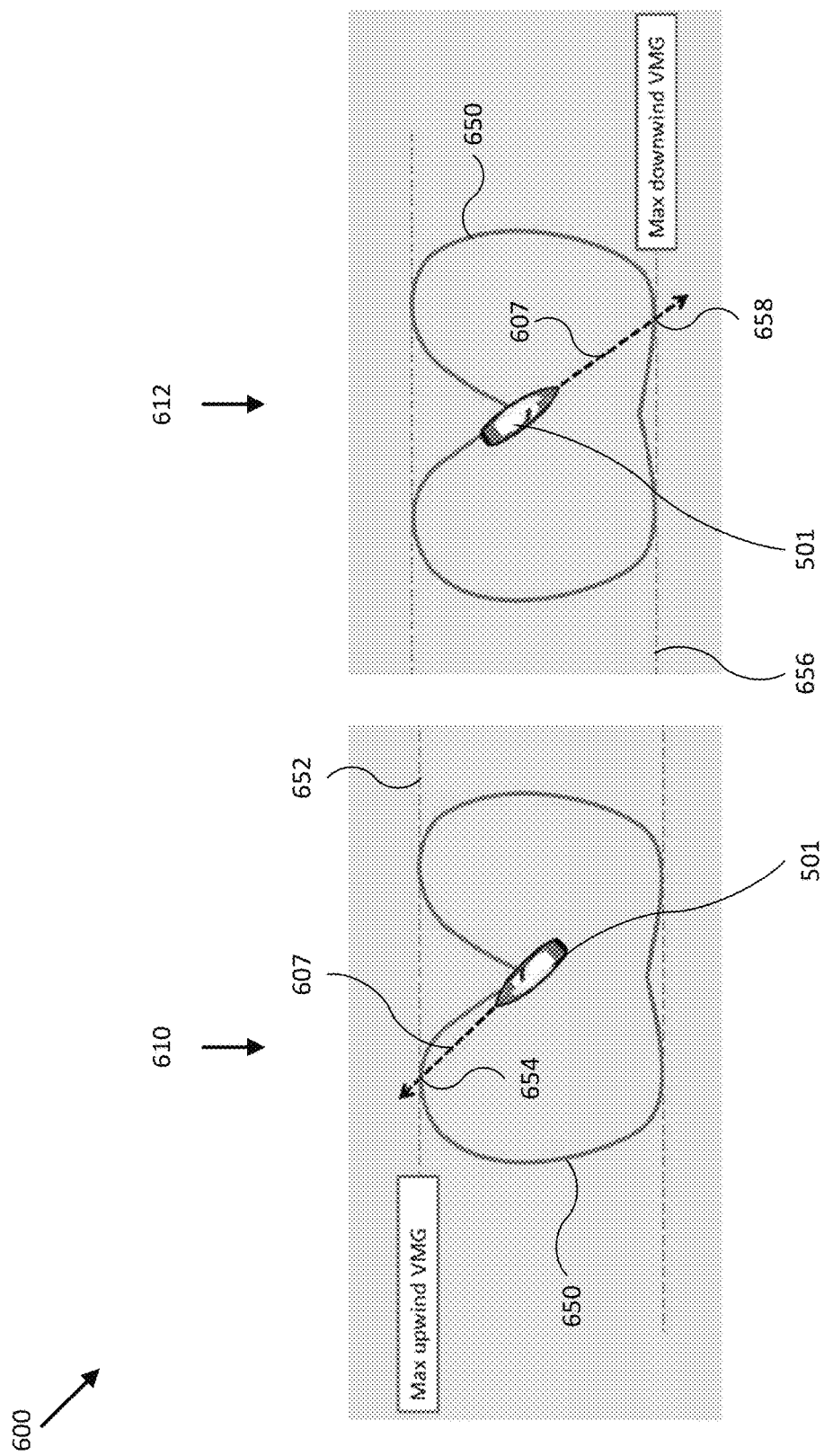

FIG. 6 illustrates two renderings 610, 612 of a sail chart 600 according to embodiments of the disclosure. Renderings 610, 612 include renderings of mobile structure icon 501, heading vector 607, and performance contour 650 including port target upwind heading 654 (e.g., corresponding to an estimated maximum velocity for mobile structure 101 on starboard tack relative to the upwind direction) and port target downwind heading 658 (e.g., corresponding to an estimated maximum velocity for mobile structure 101 on port tack relative to the downwind direction). Also shown are lines 652 and 658 indicating maximum upwind and downwind velocity made good limits, respectively. Each rendering 610, 612 is implemented such that a vertical axis of the rendering is substantially aligned with the wind direction and the performance contour for the mobile structure, for example, and each rendering can be dynamically updated as the wind direction changes.

Performance contour 650 provides a mobile structure's maximum expected speed performance at every relative heading (e.g., angle of true wind), for a given wind speed. By rendering the correct performance contour in the sail chart (here orientated with the wind direction to the top of the screen), a user can quickly and intuitively identify which heading adjustments will yield the best results in a race in terms of maximizing VMG (Velocity Made Good). The correct performance contour may be automatically selected by the system (e.g., controller 130) from a database of performance/polar contours that are cross referenced to factors such as wind speed, sea state, sail-set etc. The correct performance contour is thus rendered and/or displayed at all times, based on a combination of sensor input (e.g., from orientation sensor 140, wind sensor 143, and/or other sensors), and/or user input (e.g., the current sail set, number of crew members, draft, and/or other configurations of mobile structure 101). Optimum headings can be highlighted on the sail chart by use of shaded regions, colored arrows or similar, as described herein.

Figure 7:
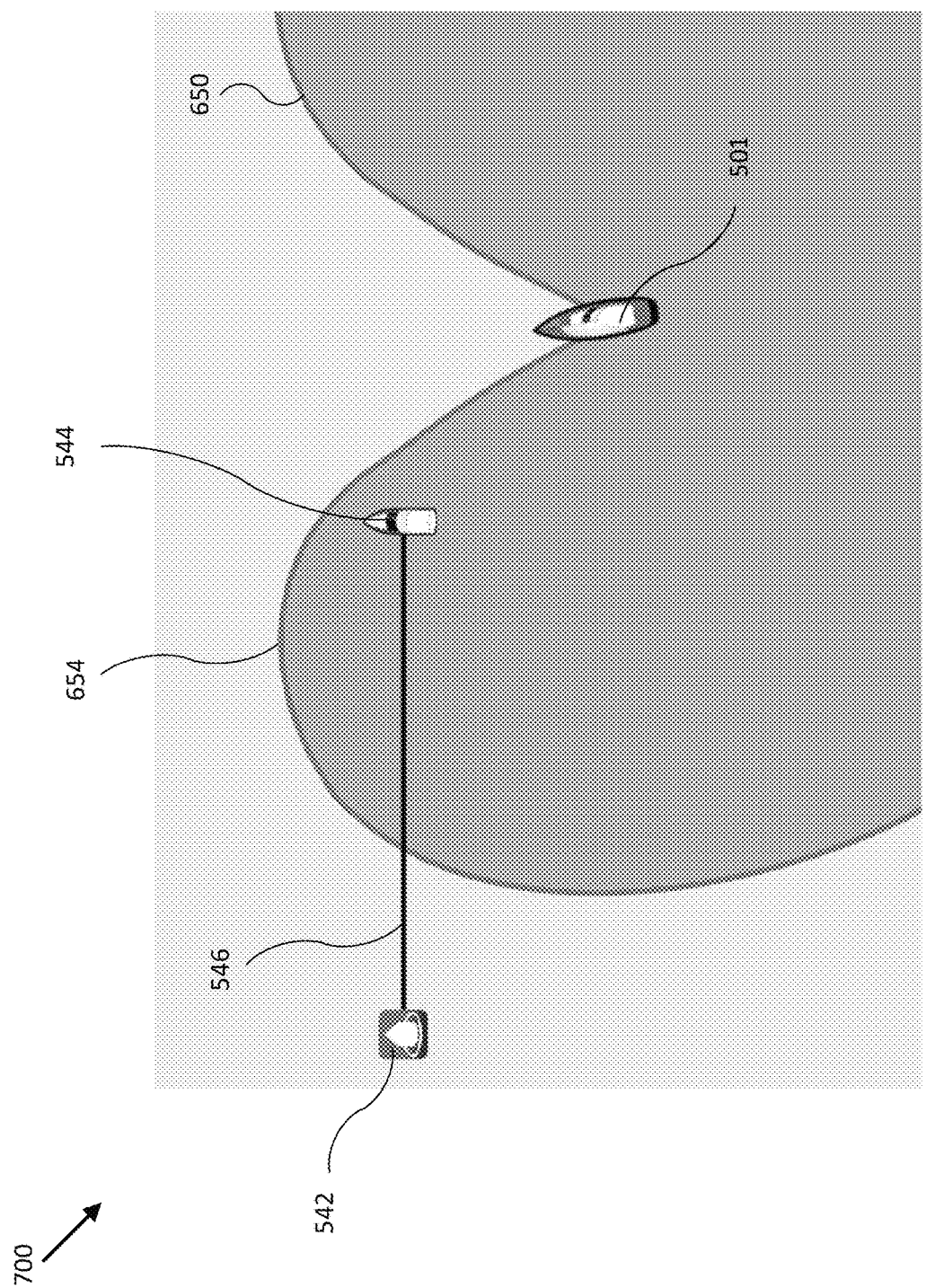

FIG. 7 illustrates rendering 700 of a sail chart according to an embodiment of the disclosure. Rendering 700 includes renderings of mobile structure icon 501, various chart objects (pylon 542, community boat icon 544, race start line 546), and performance contour 650 including port target upwind heading 654. Rendering 700 is implemented such that a vertical axis of the rendering is substantially aligned with the wind direction and the performance contour for the mobile structure, for example, and performance contour 650 is scaled according to a reference time period (here, a start time countdown) to indicate an estimated maximum travel of the mobile structure during the reference time period. Rendering 700 can be dynamically updated as the wind direction changes and the reference time period extinguishes.

By scaling the performance contour size to the distance traveled within a fixed time period, it is possible to visualize the potential end position of the mobile structure at the end of that time period. For instance, when the user sets a race timer, the performance contour will always show the distance the mobile structure could travel before the countdown ends (assuming the mobile structure is properly trimmed and travelling at maximum speed). The performance contour will thus gradually contract, and the sailor will aim to place the performance contour edge on, or slightly behind the start line when they begin their final approach to the line. In FIG. 7, the mobile structure is "burning time", waiting for the performance contour to get closer to the start line, before sheeting-in and accelerating.

Figure 8:
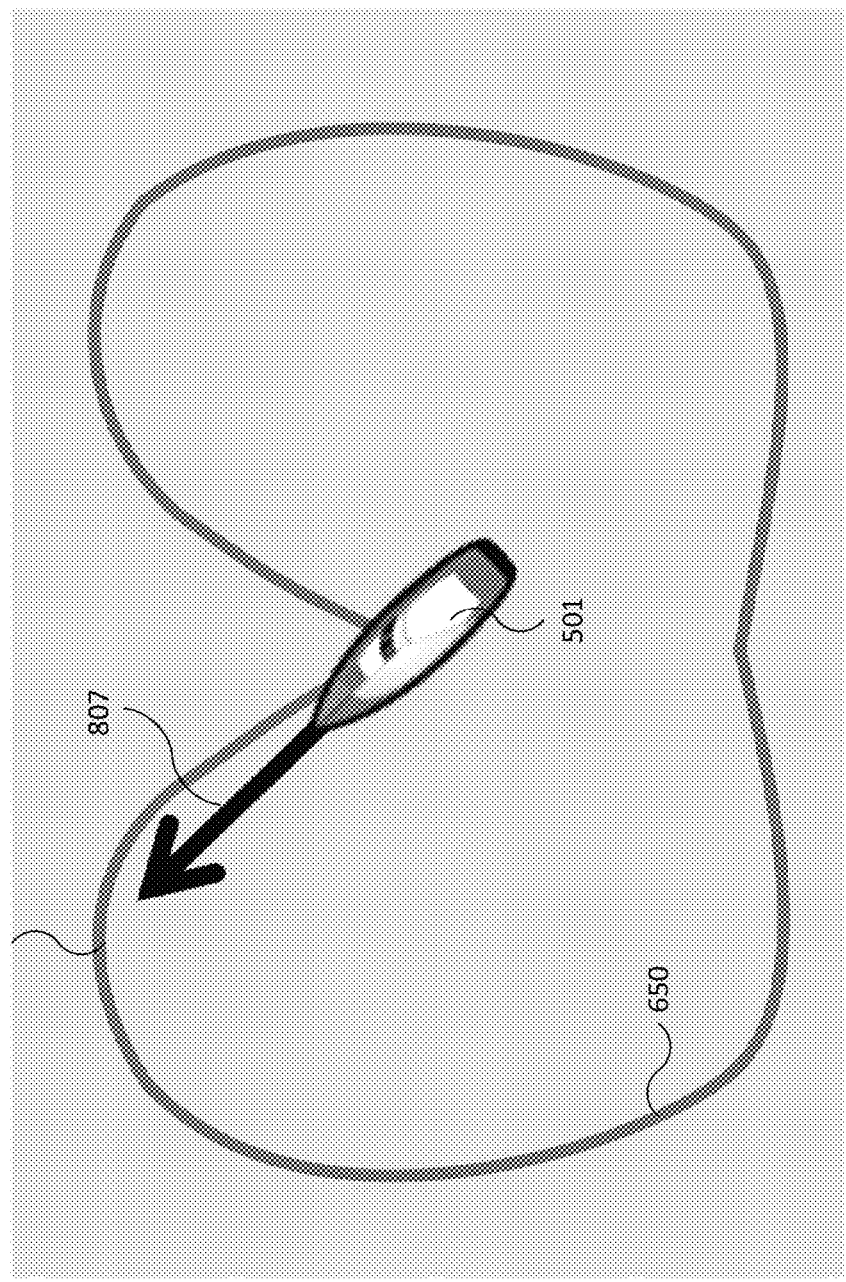

FIG. 8 illustrates rendering 800 of a sail chart according to an embodiment of the disclosure. Rendering 800 includes renderings of mobile structure icon 501, scaled heading vector 807, and performance contour 650 including port target upwind heading 654. Rendering 800 is implemented such that a vertical axis of the rendering is substantially aligned with the wind direction and the performance contour for the mobile structure, for example, and rendering 800 can be dynamically updated as the wind direction changes.

The current mobile structure speed can be expressed as a proportion of the maximum expected speed, by scaling the heading vector to the performance contour. When the mobile structure is at maximum speed, the heading vector will meet the edge of the performance contour. When below maximum speed, the end of the heading vector will fall short of the edge. The scaling factor may be non-linear, to increase the visual resolution of small differences close to the maximum speed.

Figure 9:
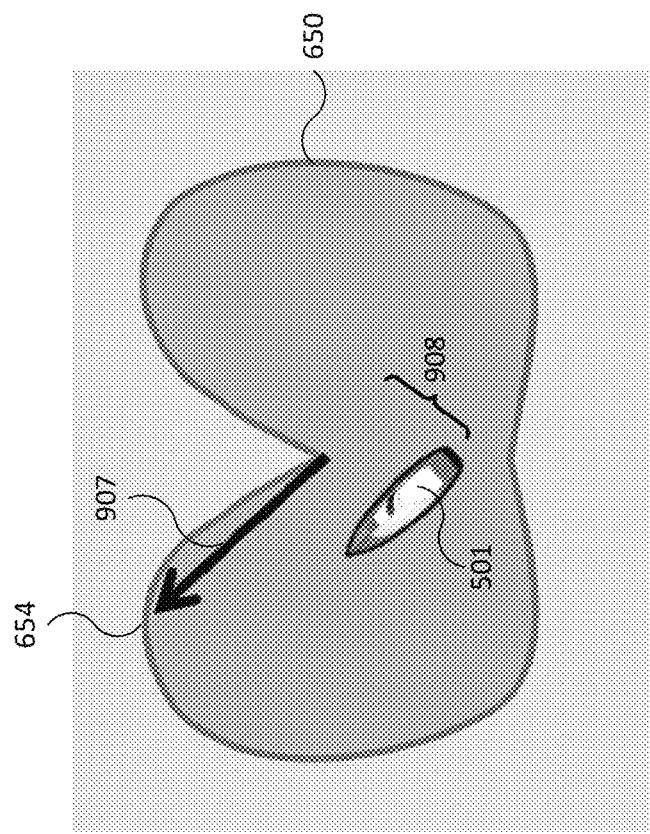
Figure 9:
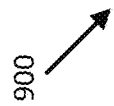

FIG. 9 illustrates rendering 900 of a sail chart according to an embodiment of the disclosure. Rendering 900 includes renderings of mobile structure icon 501, scaled heading vector 907, and performance contour 650 including port target upwind heading 654. Also shown is offset 908 of a centroid of performance contour 650 from mobile structure icon 501. Offset 908 is configured to indicate the velocity of the sailing medium (e.g., a tidal or other type of current in water) and to retain the intuitive accuracy of the sail chart and the performance contour to indicate a predicted position of mobile structure 101 after a reference time period. Rendering 900 is implemented such that a vertical axis of the rendering is substantially aligned with the wind direction and the performance contour for the mobile structure, for example, and rendering 900 can be dynamically updated as the wind direction and/or velocity of the sailing medium changes.

To account for the effects of sailing medium velocities (e.g., tidal currents), the performance contour is displaced by the velocity vector of sailing medium flow. The heading of the mobile structure is still drawn from the centroid of the performance contour; hence the chart position indicated by the heading vector will correspond to the mobile structure's final position.

Figure 10:
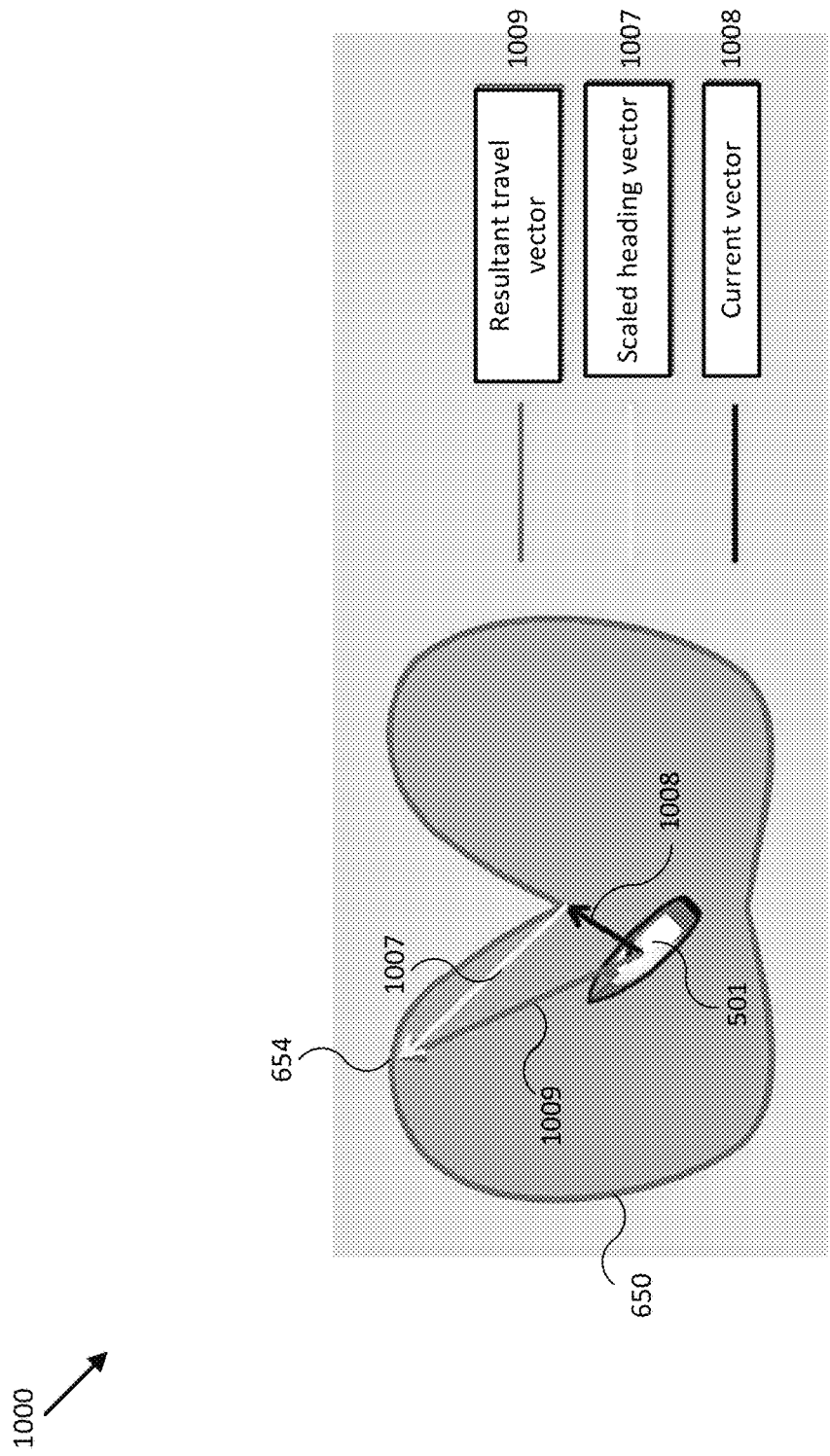

FIG. 10 illustrates rendering 1000 of a sail chart according to an embodiment of the disclosure. Rendering 1000 includes renderings of mobile structure icon 501, scaled heading vector 1007, and performance contour 650 including port target upwind heading 654. Also shown is sailing medium velocity vector 1008 and resultant travel vector 1009, which may be scaled by the same factor used to scale heading vector 1007. Sailing medium velocity vector 1008 is configured to indicate the velocity of the sailing medium (e.g., a tidal or other type of current in water) and to retain the intuitive accuracy of the sail chart and the performance contour to indicate a predicted position of mobile structure 101 after a reference time period. Rendering 1000 is implemented such that a vertical axis of the rendering is substantially aligned with the wind direction and the performance contour for the mobile structure, for example, and rendering 1000 can be dynamically updated as the wind direction and/or velocity of the sailing medium changes. Rendering 1000 is an alternative version of rendering 900 with additional descriptive information.

Figure 11:
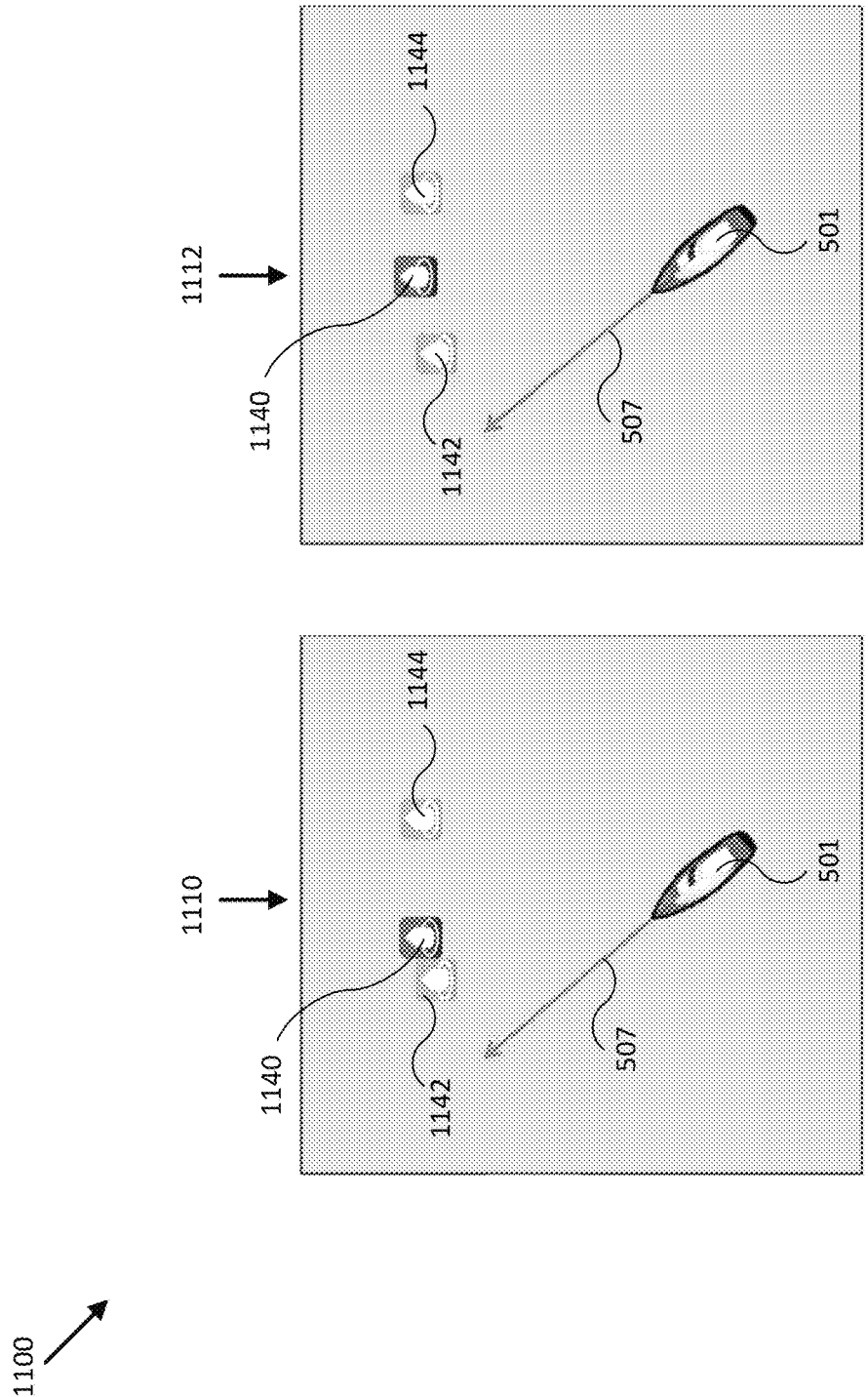

FIG. 11 illustrates two renderings 1110, 1112 of a sail chart 1100 according to embodiments of the disclosure. Renderings 1110, 1112 include renderings of mobile structure icon 501, heading vector 507, and various chart objects (e.g., chart object 1140, port extent icon 1142, and starboard extent icon 1144). Renderings 1110, 1112 are implemented such that a vertical axis of the renderings is substantially aligned with the wind direction for the mobile structure, for example, and renderings 1110, 1112 can be dynamically updated as the wind direction changes. Rendering 1112 is an updated version of rendering 1110 after a change in the wind direction.

In some embodiments, the positions of port extent icon 1142 and starboard extent icon 1144 correspond to the range of wind direction changes for the mobile structure over a prior time period. As the wind direction changes, the chart objects will seem to rotate around the mobile structure position (since wind direction is fixed from the top of the chart). In order to show the user the range of the wind shifts, the currently active chart object (e.g., a waypoint) will have two extent icons or "ghost marks" associated with it. These represent the positions of the chart object relative to the wind, at the two extremes of the sail chart's swing. The position of each extent icon may be based on a statistical formula (e.g., 90th percentile, over the last 10 minutes of recorded wind history).

Figure 12:
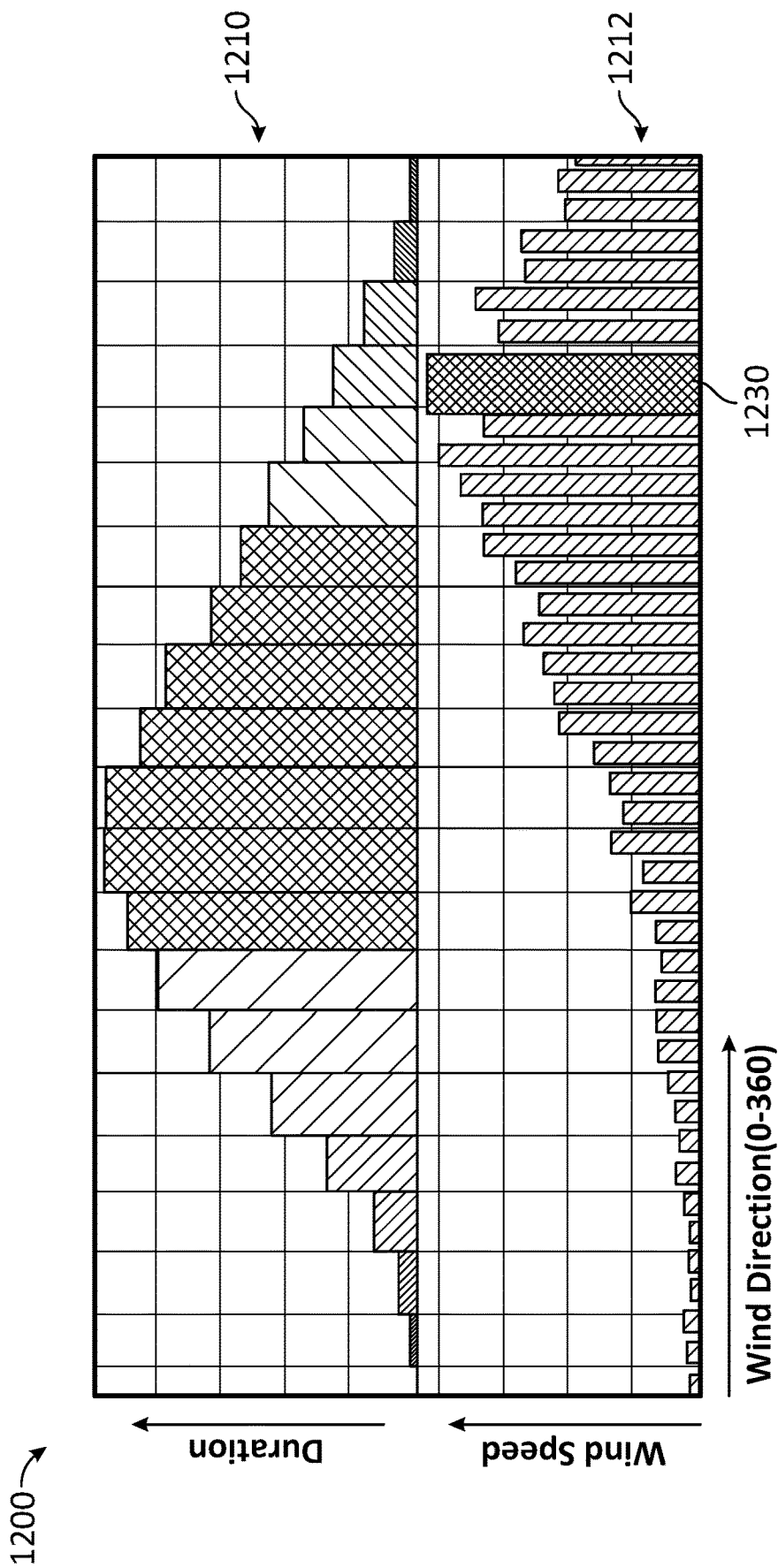

FIG. 12 illustrates two renderings 1210, 1212 of wind histograms 1200 according to embodiments of the disclosure. Rendering 1210 indicates a distribution of absolute wind directions, and rending 1212 indicates a distribution of average wind speeds and a current absolute wind direction 1230 (e.g., the red portion). Renderings 1210, 1212 can be dynamically updated as the wind direction changes.

The sail chart can include one or more wind histograms that show the history of wind direction and strength. This allows the user to assess the current wind direction relative to recent trends, and to see how wind strength is varying with direction. In FIG. 12, the x-axis represents the absolute wind direction between the extremes of its measured history. Rendering 1210 shows the proportion of time at which the wind was recorded at each angle. Recent measurements are shown in red. Older measurements are represented by the rest of the color spectrum (i.e., violet=oldest). Rendering 1212 shows the average wind speed at the corresponding angles. The red bar represents the current wind direction. The interpretation of renderings 1210 and 1212 is that the wind direction is close to the extreme right of its current shift pattern, and the wind speed is at its strongest in this region.

Figure 13:
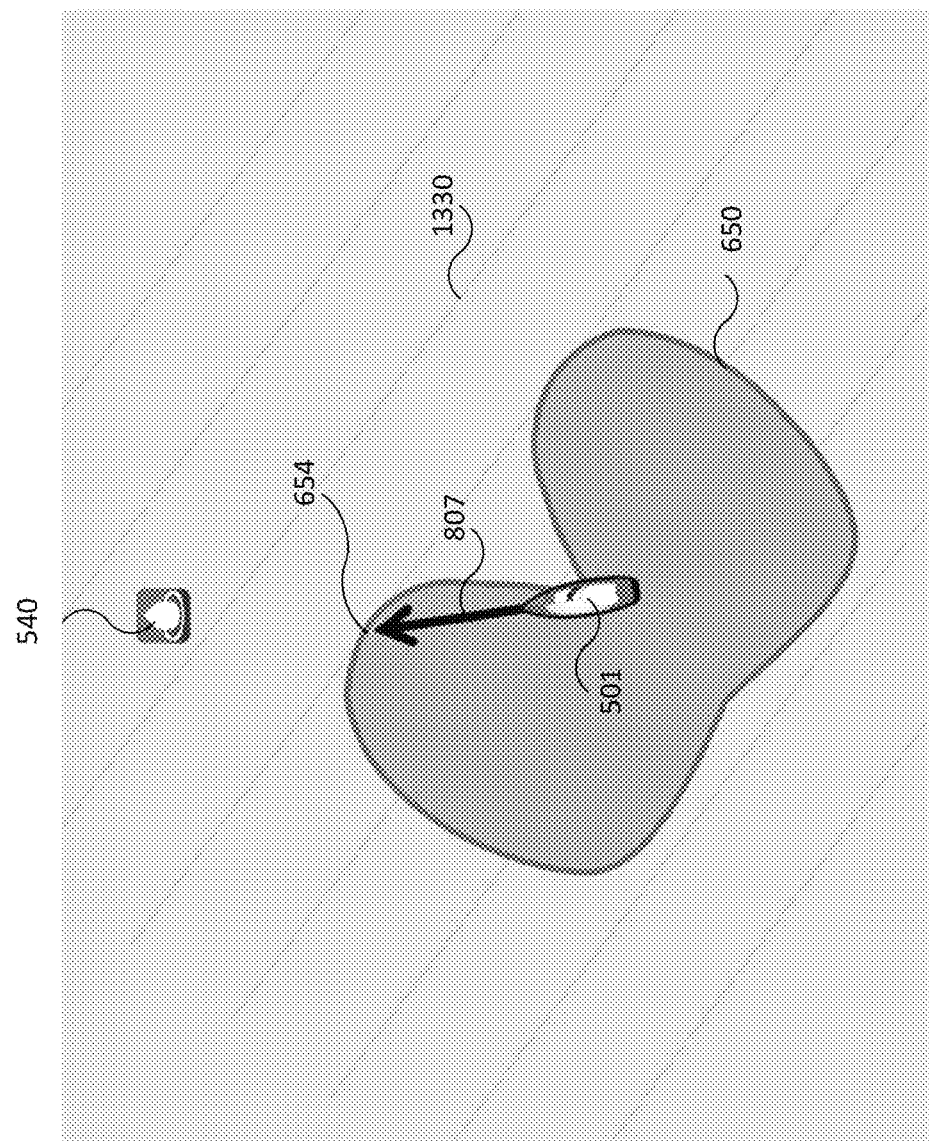

FIG. 13 illustrates rendering 1300 of a sail chart according to an embodiment of the disclosure. Rendering 1300 includes renderings of mobile structure icon 501, scaled heading vector 807, chart object 540, and performance contour 650 including port target upwind heading 654. Also shown are grid lines 1330 indicating the wind direction. Rendering 1300 is implemented such that a vertical axis of the rendering is substantially aligned with a vector (not explicitly shown) corresponding to a position of chart object 540 relative to a position of the mobile structure, for example, and rendering 1300 can be dynamically updated as the position of chart object 540 and/or the mobile structure changes.

An embodiment is provided to render and/or display the sail chart with a selected chart object (e.g., the active waypoint) always placed at the top of the screen. In this embodiment, the performance contour is rotated to face the wind direction as it shifts direction relative to the chart object. To maintain the visual overview of the chart object's position relative to the wind, grid lines 1133 may be rendered perpendicular to the wind direction as shown.

Figure 14:
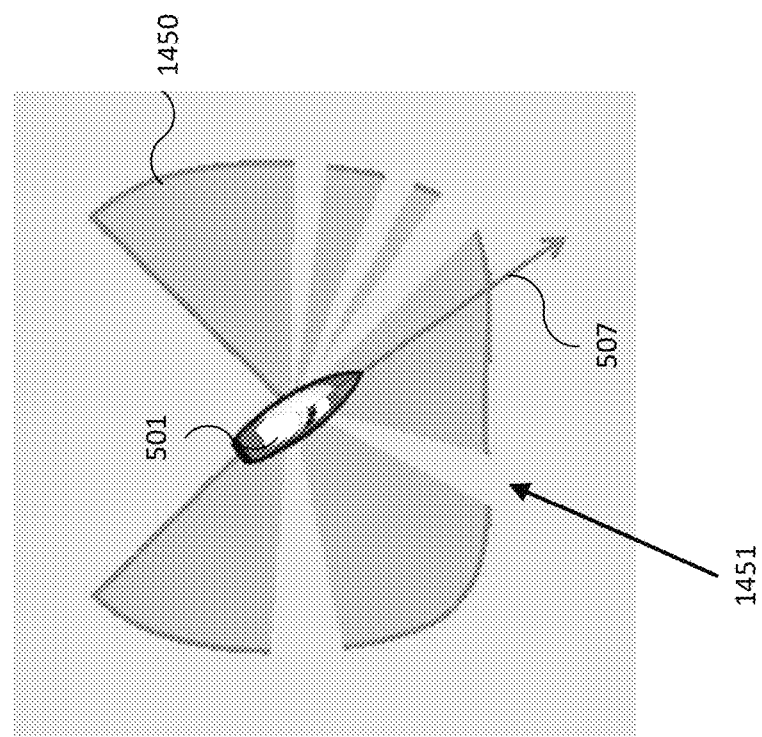

FIG. 14 illustrates rendering 1400 of a sail chart according to an embodiment of the disclosure. Rendering 1400 includes renderings of mobile structure icon 501, heading vector 507, and sea trial performance contour 1450 including various incomplete portions 1451. Rendering 1400 is implemented such that a vertical axis of the rendering is substantially aligned with the wind direction and the performance contour for the mobile structure, for example, and rendering 1400 can be dynamically updated as the wind direction changes and/or the incomplete portions 1451 are updated.

Sea trial performance contour 1450 may be based, at least in part, on a set of maximum achieved measured speeds stored and cross referenced over time. As shown, as sea trial performance contour 1450 is developed over time, it includes fewer and fewer incomplete portions 1451 corresponding to relative headings with deficient measured speeds. Controller 130 may be configured to updating the set of maximum achieved measured speeds to account for incomplete portions 1451 by rendering and/or displaying incomplete portions 1451 to encourage a user to maneuver mobile structure 101 and measure a series of relative wind velocities, measured speeds, orientations, configurations, and/or environmental conditions corresponding to incomplete portions 1451. Alternatively, or in addition, controller 130 may be configured to autopilot mobile structure 101 to make such measurements, for example, or may be configured to interpolate across incomplete portions 1451.

Embodiments of the present disclosure allow the user to record their own performance contour data, so that the generated performance contours can be used on the sail chart during a race. The user may activate a "sea trial mode" and the sailing user interface system will record the best achieved performance data, cross referenced to conditions of wind speed, sea state etc. A partially completed sea trial performance contour 1450 may be displayed to the user during sea trial mode, so that the user may complete the contour by steering the mobile structure to the appropriate angles.

Figure 15:
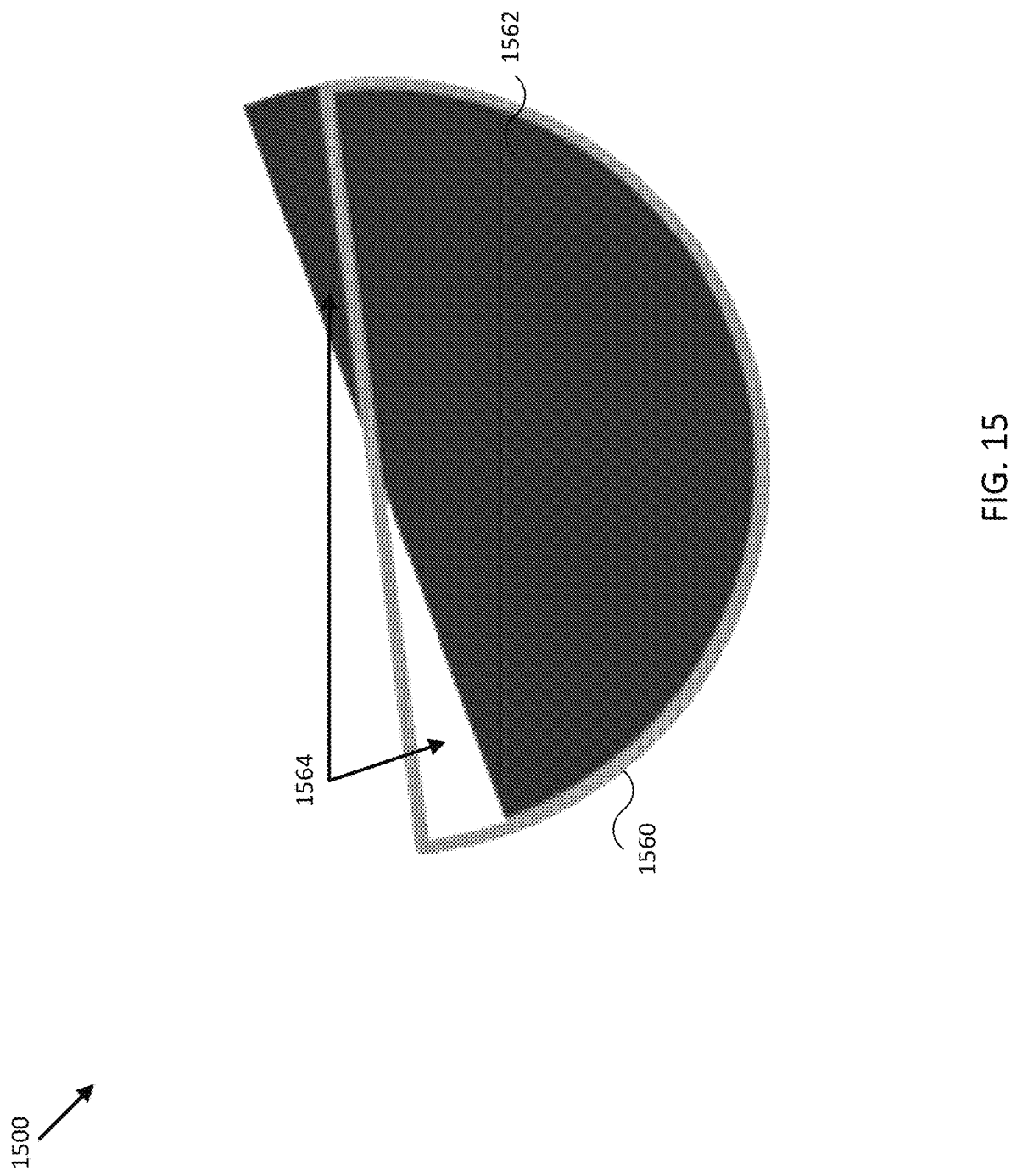

FIG. 15 illustrates rendering 1500 of a heel angle excursion diagram according to an embodiment of the disclosure. Rendering 1500 includes renderings of target roll angle 1560, current roll angle 1562, and roll angle error 1564. Rendering 1500 is implemented such that a vertical axis of the rendering is substantially aligned with the gravitational "down" vector, for example, and rendering 1500 can be dynamically updated as the orientation of the mobile structure changes and/or target roll angle 1560 is updated. As described herein, target roll angle 1560 is related to the corresponding performance contour for the mobile structure, and target error 1564 indicates the magnitude and direction of a roll angle adjustment to maximize the potential speed of the mobile structure.

The roll angle (e.g., heel angle) of the mobile structure may be visualized relative to the optimum value by use of a dynamic diagram. The diagram may be cross-referenced to the current performance contour, to show the roll angle required to achieve maximum performance for the conditions. Similarly, the pitch angle may also be visualized relative to an optimum value by use of a dynamic diagram.

Where applicable, various embodiments provided by the present disclosure can be implemented using hardware, software, or combinations of hardware and software. Also where applicable, the various hardware components and/or software components set forth herein can be combined into composite components comprising software, hardware, and/or both without departing from the spirit of the present disclosure. Where applicable, the various hardware components and/or software components set forth herein can be separated into sub-components comprising software, hardware, or both without departing from the spirit of the present disclosure. In addition, where applicable, it is contemplated that software components can be implemented as hardware components, and vice-versa.

Software in accordance with the present disclosure, such as non-transitory instructions, program code, and/or data, can be stored on one or more non-transitory machine readable mediums. It is also contemplated that software identified herein can be implemented using one or more general purpose or specific purpose computers and/or computer systems, networked and/or otherwise. Where applicable, the ordering of various steps described herein can be changed, combined into composite steps, and/or separated into sub-steps to provide features described herein.

Embodiments described above illustrate but do not limit the invention. It should also be understood that numerous modifications and variations are possible in accordance with the principles of the invention. Accordingly, the scope of the invention is defined only by the following claims.

What is claimed is:

1. A system comprising:
a logic device configured to receive one or more sensor signals and render a sail chart for a mobile structure, wherein the logic device is adapted to:
receive a heading for the mobile structure;
determine a wind direction for the mobile structure; and
render the sail chart on a display of a user interface, wherein the sail chart indicates the heading of the mobile structure relative to the wind direction and a performance contour for the mobile structure;
wherein the rendering the sail chart comprises rendering the performance contour, a heading vector, and a mobile structure icon substantially within or over the performance contour, wherein the performance contour comprises a polar contour indicating estimated maximum speeds for the mobile structure as a function of the heading of the mobile structure relative to the wind direction, and wherein the heading of the mobile structure relative to the wind direction and the rendered performance contour is indicated, at least in part, by an orientation of the heading vector and/or the mobile structure icon relative to the performance contour rendered in the sail chart.

2. The system of claim 1, wherein the logic device is adapted to determine the wind direction for the mobile structure by:
receiving an absolute wind direction from a wind sensor mounted to the mobile structure; and
determining the wind direction based, at least in part, on the absolute wind direction and/or the heading.

3. The system of claim 1, wherein:
the rendering the sail chart comprises rendering one or more chart objects;
a vertical axis of the sail chart rendering is substantially aligned with the wind direction; and
each of the one or more chart objects indicate a position of a waypoint, a race pylon, a committee boat, a race start line, a competitor, a course limit, a stationary or mobile course hazard, and/or a physical object relative to a position of the mobile structure.

4. The system of claim 1, wherein:
the mobile structure comprises a watercraft, aircraft, robot, drone, and/or a type of vehicle;
the rendering the sail chart comprises rendering one or more chart objects;
the rendering the one or more chart objects comprises rendering a port extent icon and a starboard extent icon for at least one chart object;
the positions of the port and starboard extent icons correspond to a range of wind direction changes for the mobile structure over a prior time period; and
a vertical axis of the sail chart rendering is substantially aligned with the wind direction and/or a vector corresponding to the position of the at least one chart object relative to the position of the mobile structure.

5. The system of claim 1, wherein:
the performance contour is substantially aligned with the wind direction; and
the rendering the heading vector comprises scaling the length of the heading vector to indicate a measured speed of the mobile structure relative to a corresponding estimated maximum speed from the performance contour.

6. The system of claim 1, wherein:
the rendering the performance contour comprises scaling the polar contour according to a reference time period to indicate an estimated maximum travel of the mobile structure during the reference time period; and
a vertical axis of the sail chart rendering is substantially aligned with the wind direction and/or a vector corresponding to a rendered chart object position relative to a position of the mobile structure.

7. The system of claim 1, wherein:
the logic device is configured to determine a velocity vector for a sailing medium of the mobile structure based, at least in part, on a time series of absolute positions for the mobile structure; and
the rendering the performance contour, the heading vector, and/or the mobile structure icon comprises rendering the performance contour offset from the mobile structure icon by the velocity vector for the sailing medium.

8. The system of claim 1, wherein the logic device is adapted to determine the performance contour by:
receiving a series of relative wind velocities from a wind sensor mounted to the mobile structure;
determining a corresponding series of measured speeds, orientations, configurations, and/or environmental conditions for the mobile structure;
detecting a set of maximum achieved measured speeds cross referenced to the series of relative wind velocities, orientations, configurations, and/or environmental conditions; and determining the performance contour based, at least in part, on the set of maximum achieved measured speeds.

9. The system of claim 8, wherein the determining the performance contour based, at least in part, on the set of maximum achieved measured speeds comprises:
rendering a sea trial performance contour based, at least in part, on the set of maximum achieved measured speeds, wherein the sea trial performance contour comprises one or more incomplete portions corresponding to relative headings with deficient measured speeds;
updating the set of maximum achieved measured speeds to account for the incomplete portions of the sea trial performance contour by receiving an updated series of relative wind velocities, measured speeds, orientations, configurations, and/or environmental conditions and/or by interpolating across the incomplete portions; and
determining the performance contour based, at least in part, on the updated set of maximum achieved measured speeds.

10. The system of claim 1, wherein the logic device is adapted to:
receive a series of relative wind velocities from a wind sensor mounted to the mobile structure;
determine a distribution of absolute wind directions and/or a distribution of average wind speeds for selected intervals of absolute wind directions based, at least in part, on the series of relative wind velocities and/or a corresponding series of headings for the mobile structure; and
render one or more wind histograms as an overlay and/or portion of the sail chart, wherein the one or more wind histograms comprises a chart indicating the distribution of absolute wind directions, the distribution of average wind speeds, and/or a current absolute wind direction.

11. The system of claim 1, wherein the logic device is adapted to:
receive a roll angle for the mobile structure;
determine a target roll angle based, at least in part, on the wind direction, the heading, and/or the performance contour; and
render a heel angle excursion diagram based on the roll angle and the target roll angle as an overlay and/or portion of the sail chart, wherein the heel angle excursion diagram indicates the roll angle, the target roll angle, and/or a magnitude and direction of a roll angle error between the target roll angle and the roll angle.

12. The system of claim 1, further comprising the user interface and a steering actuator in communication with the logic device, wherein the logic device is adapted to:
receive a target waypoint for the mobile structure from the user interface; and
control the steering actuator to pilot the mobile structure according to a sailing route to the target waypoint, wherein the sailing route is based, at least in part, on the heading, the wind direction, and the performance contour.

13. A method comprising:
receiving a heading for a mobile structure;
determining a wind direction for the mobile structure; and
rendering, by a logic device, a sail chart on a display of a user interface for the mobile structure, wherein the sail chart indicates the heading of the mobile structure relative to the wind direction and/or a performance contour for the mobile structure;
wherein the rendering the sail chart comprises rendering the performance contour, a heading vector, and a mobile structure icon substantially within the performance contour, wherein the performance contour comprises a polar contour indicating estimated maximum speeds for the mobile structure as a function of the heading of the mobile structure relative to the wind direction, and wherein the heading of the mobile structure relative to the wind direction and the rendered performance contour is indicated, at least in part, by an orientation of the heading vector and the mobile structure icon relative to the performance contour rendered in the sail chart.

14. The method of claim 13, wherein:
the rendering the sail chart comprises rendering one or more chart objects;
a vertical axis of the sail chart rendering is substantially aligned with the wind direction; and
each of the one or more chart objects indicate a position of a waypoint, a race pylon, a committee boat, a race start line, a competitor, a course limit, a stationary or mobile course hazard, and/or a physical object relative to a position of the mobile structure.

15. The method of claim 13, wherein:
the rendering the sail chart comprises rendering one or more chart objects;
the rendering the one or more chart objects comprises rendering a port extent icon and a starboard extent icon for at least one chart object;
the positions of the port and starboard extent icons correspond to a range of wind direction changes for the mobile structure over a prior time period; and
a vertical axis of the sail chart rendering is substantially aligned with the wind direction and/or a vector corresponding to the position of the at least one chart object relative to the position of the mobile structure.

16. The method of claim 13, wherein:
the performance contour is substantially aligned with the wind direction; and
the rendering the heading vector comprises scaling the length of the heading vector to indicate a measured speed of the mobile structure relative to a corresponding estimated maximum speed from the performance contour.

17. The method of claim 13, wherein:
the rendering the performance contour comprises scaling the polar contour according to a reference time period to indicate an estimated maximum travel of the mobile structure during the reference time period; and
a vertical axis of the sail chart rendering is substantially aligned with the wind direction and/or a vector corresponding to a rendered chart object position relative to a position of the mobile structure.

18. The method of claim 13, further comprising:
determining a velocity vector for a sailing medium of the mobile structure based, at least in part, on a time series of absolute positions for the mobile structure, wherein the rendering the performance contour, the heading vector, and/or the mobile structure icon comprises rendering the performance contour offset from the mobile structure icon by the velocity vector for the sailing medium.

19. The method of claim 13, wherein the determining the performance contour comprises:
receiving a series of relative wind velocities for the mobile structure;
determining a corresponding series of measured speeds, orientations, configurations, and/or environmental conditions for the mobile structure;

detecting a set of maximum achieved measured speeds cross referenced to the series of relative wind velocities, orientations, configurations, and/or environmental conditions; and determining the performance contour based, at least in part, on the set of maximum achieved measured speeds.

20. The method of claim 19, wherein the determining the performance contour based, at least in part, on the set of maximum achieved measured speeds comprises:

rendering a sea trial performance contour based, at least in part, on the set of maximum achieved measured speeds, wherein the sea trial performance contour comprises one or more incomplete portions corresponding to relative headings with deficient measured speeds;

updating the set of maximum achieved measured speeds to account for the incomplete portions of the sea trial performance contour by receiving an updated series of relative wind velocities, measured speeds, orientations, configurations, and/or environmental conditions and/or by interpolating across the incomplete portions; and determining the performance contour based, at least in part, on the updated set of maximum achieved measured speeds.

21. The method of claim 13, further comprising:

receiving a series of relative wind velocities for the mobile structure;

determining a distribution of absolute wind directions and/or a distribution of average wind speeds for selected intervals of absolute wind directions based, at least in part, on the series of relative wind velocities and/or a corresponding series of headings for the mobile structure; and rendering one or more wind histograms as an overlay and/or portion of the sail chart, wherein the one or more wind histograms comprises a chart indicating the distribution of absolute wind directions, the distribution of average wind speeds, and/or a current absolute wind direction.

22. The method of claim 13, further comprising:

receiving a roll angle for the mobile structure;

determining a target roll angle based, at least in part, on the wind direction, the heading, and/or the performance contour; and rendering a heel angle excursion diagram based on the roll angle and the target roll angle as an overlay and/or portion of the sail chart, wherein the heel angle excursion diagram indicates the roll angle, the target roll angle, and/or a magnitude and direction of a roll angle error between the target roll angle and the roll angle.

* * * * *